US011970651B2

(12) United States Patent
Takahashi et al.

(10) Patent No.: US 11,970,651 B2
(45) Date of Patent: Apr. 30, 2024

(54) SURFACE TREATMENT AGENT

(71) Applicant: DAIKIN INDUSTRIES, LTD., Osaka (JP)

(72) Inventors: Kanako Takahashi, Osaka (JP); Ryousuke Hara, Osaka (JP); Ikuo Yamamoto, Osaka (JP)

(73) Assignee: DAIKIN INDUSTRIES, LTD., Osaka (JP)

( * ) Notice: Subject to any disclaimer, the term of this patent is extended or adjusted under 35 U.S.C. 154(b) by 844 days.

(21) Appl. No.: 16/997,405

(22) Filed: Aug. 19, 2020

(65) Prior Publication Data

US 2020/0377774 A1 Dec. 3, 2020

Related U.S. Application Data

(63) Continuation of application No. PCT/JP2019/004688, filed on Feb. 8, 2019.

(30) Foreign Application Priority Data

Feb. 20, 2018 (JP) ................. 2018-028204

(51) Int. Cl.
| | | |
|---|---|---|
| C09K 3/18 | (2006.01) | |
| C08F 214/06 | (2006.01) | |
| C08F 214/08 | (2006.01) | |
| C08F 214/16 | (2006.01) | |
| C08F 214/18 | (2006.01) | |
| C08F 220/18 | (2006.01) | |
| C08F 220/20 | (2006.01) | |
| C08F 220/28 | (2006.01) | |
| C08F 220/34 | (2006.01) | |
| C08F 220/56 | (2006.01) | |
| C08L 83/04 | (2006.01) | |

(52) U.S. Cl.
CPC .............. *C09K 3/18* (2013.01); *C08F 214/06* (2013.01); *C08F 214/08* (2013.01); *C08F 214/16* (2013.01); *C08F 214/182* (2013.01); *C08F 220/1818* (2020.02); *C08F 220/20* (2013.01); *C08F 220/283* (2020.02); *C08F 220/34* (2013.01); *C08F 220/56* (2013.01); *C08L 83/04* (2013.01)

(58) Field of Classification Search
CPC .... C08F 214/06; C08F 214/08; C08F 214/16; C08F 214/182; C08F 220/1818; C08F 220/20; C08F 220/283; C08F 220/34; C08F 220/56; C08F 20/14; C08F 20/36; C08F 220/24; C08F 214/00; C08G 77/12; C08K 5/01; C08L 83/04; C08L 33/08; C08L 33/16; C08L 27/00; C08L 33/26; C08L 101/00; C09D 183/04; C09D 133/16; C09K 3/18; D06M 15/653; D06M 2200/11; D06M 2200/12; D06M 15/263; D06M 15/267; D06M 15/277; D06M 15/643

See application file for complete search history.

(56) References Cited

U.S. PATENT DOCUMENTS

| | | | |
|---|---|---|---|
| 5,225,480 A | 7/1993 | Tseng et al. | |
| 5,889,086 A * | 3/1999 | Ushijima | ................ C03C 17/30 |
| | | | 524/588 |
| 7,482,419 B2 | 1/2009 | Caprasse et al. | |
| 8,703,894 B2 | 4/2014 | Duschek et al. | |
| 9,845,410 B2 | 12/2017 | Sworen et al. | |
| 10,407,823 B2 | 9/2019 | Knaup et al. | |
| 10,597,816 B2 | 3/2020 | Knaup et al. | |
| 10,844,151 B2 | 11/2020 | Probst et al. | |
| 2010/0190397 A1 | 7/2010 | Duschek et al. | |
| 2015/0361300 A1 | 12/2015 | Sworen et al. | |

(Continued)

FOREIGN PATENT DOCUMENTS

| | | |
|---|---|---|
| EP | 0 527 286 A1 | 2/1993 |
| EP | 2 208 771 A | 7/2010 |

(Continued)

OTHER PUBLICATIONS

International Search Report for PCT/JP2019/004688 dated Apr. 23, 2019.

(Continued)

*Primary Examiner* — Anthony J Green

(74) *Attorney, Agent, or Firm* — Sughrue Mion, PLLC

(57) ABSTRACT

A surface treatment agent containing: (A) a water repellent oil repellent polymer having a repeating unit derived from at least one water repellent oil repellent monomer selected from (A1) fluorine-containing monomers and (A2) non-fluorine monomers having a hydrocarbon group with 7-40 carbon atoms; (B) a silicone polymer represented by formula $R^{53}{}_3Si\!-\!O\!-\![\!-\!Si(R^{51})_2\!-\!O\!-\!]_a\!-\![\!-\!Si(R^{51})(R^{52})\!-\!O\!-\!]_b\!-\!SiR^{53}{}_3$ (wherein each $R^{51}$ group independently represents hydrogen, alkyl having 1-20 carbon atoms, aryl having 6-20 carbon atoms or alkoxy having 1-4 carbon atoms; each $R^{52}$ independently represents a saturated hydrocarbon group having 23-40 carbon atoms; each $R^{53}$ independently represents a hydrogen atom, an alkyl group having 1-20 carbon atoms, an aryl group having 6-20 carbon atoms, an alkoxy group having 1-4 carbon atoms or a saturated hydrocarbon group having 23-40 carbon atoms; a represents an integer of 0 or more; b represents an integer of 1 or more; and (a+b) is 10-200); and (C) a liquid medium.

20 Claims, No Drawings

(56) References Cited

U.S. PATENT DOCUMENTS

| | | |
|---|---|---|
| 2017/0130394 A1 | 5/2017 | Knaup et al. |
| 2017/0158850 A1 | 6/2017 | Knaup et al. |
| 2017/0204558 A1 | 7/2017 | Knaup |
| 2018/0016739 A1 | 1/2018 | Coppens et al. |
| 2020/0017616 A1 | 1/2020 | Probst et al. |

FOREIGN PATENT DOCUMENTS

| | | | |
|---|---|---|---|
| EP | 2 152 957 | B1 | 9/2010 |
| EP | 3 919 672 | A1 | 12/2021 |
| JP | 4-222886 | A | 8/1992 |
| JP | 5-43885 | A | 2/1993 |
| JP | 5-156277 | A | 6/1993 |
| JP | 07053922 | A * | 2/1995 |
| JP | 8-48942 | A | 2/1996 |
| JP | 10-245783 | A | 9/1998 |
| JP | 2000-80353 | A | 3/2000 |
| JP | 2015-120895 | A | 7/2015 |
| JP | 2017-521517 | A | 8/2017 |
| JP | 2017-521518 | A | 8/2017 |
| JP | 2017-523266 | A | 8/2017 |
| JP | 2017-155095 | A | 9/2017 |
| JP | 6206612 | B1 | 10/2017 |
| JP | 2018-506657 | A | 3/2018 |
| WO | 2015/191326 | A1 | 12/2015 |
| WO | 2016/000829 | A1 | 1/2016 |
| WO | 2016/000830 | A1 | 1/2016 |
| WO | 2016/048642 | A1 | 3/2016 |
| WO | 2016/048684 | A1 | 3/2016 |
| WO | 2018/054712 | A1 | 3/2018 |

OTHER PUBLICATIONS

International Preliminary Report on Patentability and Translation of Written Opinion of the International Searching Authority for PCT/JP2019/004688 dated Sep. 3, 2020.

Extended European Search Report dated Sep. 24, 2021 in European Application No. 19757343.9.

Written Submission of Publications issued Apr. 6, 2021 in Japanese Application 2020-501681.

* cited by examiner

SURFACE TREATMENT AGENT

CROSS-REFERENCE TO RELATED APPLICATION

This application is a continuation of PCT/JP2019/004688 filed Feb. 8, 2019, which claims priority from Japanese Patent Application No. 2018-028204 filed Feb. 20, 2018. The above-identified applications are incorporated herein by reference in their entirety.

TECHNICAL FIELD

The present disclosure relates to a surface treatment agent containing a water- and oil-repellent polymer and a silicone polymer. Specifically, the surface treatment agent of the present disclosure is capable of imparting excellent water-repellency, oil-repellency and antifouling property to textile products (e.g. carpets), paper, nonwoven fabrics, stone materials, electrostatic filters, antidust masks, and components of fuel cells.

BACKGROUND ART

Fluorine-containing water- and oil-repellent agents containing fluorine compounds have been heretofore known. The water- and oil-repellent agent gives good water- and oil-repellency when applied to a substrate such as a textile product.

Results of recent studies [EPA Report "preliminary risk assessment of the developmental toxicity associated with exposure to perfluorooctanoic acid and its salts" (http://www.epa.gov/opptintr/pfoa/pfoara.pdf)] etc. have revealed that PFOA (perfluorooctanoic acid), which is a type of long-chain fluoroalkyl compound, may place a burden on the environment. On Apr. 14, 2003, EPA (Environmental Protection Agency) made a statement that they would intensify scientific investigation into PFOA.

Meanwhile, Federal Register (FR Vol. 68, No. 73/Apr. 16, 2003 [FRL-2303-8], http://www.epa.gov/opptintr/pfoa/pfoafr/pdf), EPA Environmental News FOR RELEASE: MONDAY Apr. 14, 2003 EPA INTENSIFIES SCIENTIFIC INVESTIGATION OF A CHEMICAL PROCESSING AID (http://www.epa.gov/opptintr/pfoa/pfoaprs.pdf) and EPA OPPT FACT SHEET Apr. 14, 2003 (http://www.epa.gov/opptintr/pfoa/pfoafacts.pdf) show that a telomer possibly produces PFOA through decomposition or metabolism (the telomer means a long-chain fluoroalkyl group). It is also shown that the telomer is used for many products having water- and oil-repellency and antifouling property, such as fire foams, care products, cleaning products, carpets, textiles, paper and leather. Fluorine-containing compounds may be accumulated in the environment.

Patent Literature 1 (JP 2017-155095 A) discloses a fluorine-free water-repellent composition containing a water-repellent aid and a fluorine-free water-repellent agent. Organo-modified silicone serving as a water-repellent aid has a hydrocarbon group having 8 to 40 carbon atoms and having an aromatic ring, or an alkyl group having 3 to 22 carbon atoms.

Patent Literature 2 (WO 2016/048684 A1) discloses a method for imparting water- and oil-repellency by using a fluorine-free urethane-based polymer.

Patent Literature 3 (WO 2016/048642 A1) discloses impartment of water-repellency by using a polymer formed from a fluorine-free monomer derived from sugar alcohol.

CITATION LIST

Patent Literature

Patent Literature 1: JP 2017-155095 A
Patent Literature 2: WO 2016/048684 A1
Patent Literature 3: WO 2016/048642 A1

SUMMARY OF INVENTION

Technical Problem

An object of the present disclosure is to provide a surface treatment agent (particularly, water-repellent agent) which imparts excellent water- and oil-repellency, particularly water-repellency, to a substrate such as a textile.

Another object of the present disclosure is to provide a surface treatment agent which imparts excellent slip resistance to a substrate such as a textile.

Solution to Problem

The present disclosure provides a surface treatment agent comprising:
(A) a water- and oil-repellent polymer having a repeating unit derived from at least one water- and oil-repellent monomer selected from (A1) a fluorine-containing monomer and (A2) a fluorine-free monomer having a hydrocarbon group having 7 to 40 carbon atoms;
(B) a silicone polymer; and
(C) a liquid medium.

The present disclosure also provides an aid for use in a surface treatment agent comprising (A) a water- and oil-repellent polymer having a repeating unit derived from at least one water- and oil-repellent monomer selected from (A1) a fluorine-containing monomer and (A2) a fluorine-free monomer having a hydrocarbon group having 7 to 40 carbon atoms, the aid comprising the silicone polymer.

The present disclosure also provides a method for producing a surface treatment agent, the method comprising:
(i) preparing an aqueous dispersion of a water- and oil-repellent polymer (A) by polymerizing in the presence of a liquid medium a monomer containing at least one water- and oil-repellent monomer selected from (A1) a fluorine-containing monomer and (A2) a fluorine-free monomer having a hydrocarbon group having 7 to 40 carbon atoms; and
(ii) adding a silicone polymer (B) to the aqueous dispersion of the water- and oil-repellent polymer.

The present disclosure also provides a method for producing a treated substrate, the method comprising applying a surface treatment agent to a substrate.

Preferred aspects of the present disclosure are as follows.

[1]

A surface treatment agent comprising:
(A) a water- and oil-repellent polymer having a repeating unit derived from at least one water- and oil-repellent monomer selected from (A1) a fluorine-containing monomer and (A2) a fluorine-free monomer having a hydrocarbon group having 7 to 40 carbon atoms, where the amount of the water- and oil-repellent monomer is 30 to 100 wt % based on the amount of the water- and oil-repellent polymer;
(B) a silicone polymer of the formula:

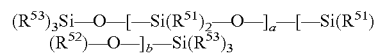

wherein each $R^{51}$ independently represents a hydrogen atom, an alkyl group having 1 to 20 carbon atoms, an aryl group having 6 to 20 carbon atoms, or an alkoxy group having 1 to 4 carbon atoms, each $R^{52}$ independently represents a saturated hydrocarbon group having 23 to 40 carbon atoms, each $R^{53}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms, a represents an integer of 0 or more, b represents an integer of 1 or more, and (a+b) is 10 to 200; and (C) a liquid medium.

[2]

The surface treatment agent according to [1], wherein the water- and oil-repellent monomer is the fluorine-containing monomer (A1), and the fluorine-containing monomer (A1) is a compound of the formula:

$$CH_2=C(-X^{11})-C(=O)-Y^{11}Z^{11}-Rf$$

wherein $X^{11}$ is a hydrogen atom, a monovalent organic group or a halogen atom, $Y^{11}$ is —O— or —NH—, $Z^{11}$ is a direct bond or a divalent organic group, and Rf is a fluoroalkyl group having 1 to 20 carbon atoms.

[3]

The surface treatment agent according to [2], wherein in the fluorine-containing monomer (A1), $X^{11}$ is a hydrogen atom, a methyl group or a chlorine atom, $Y^{11}$ is —O—, $Z^{11}$ is a direct bond, or an alkylene group having 1 to 20 carbon atoms, and Rf is a perfluoroalkyl group.

[4]

The surface treatment agent according to [2], wherein in the fluorine-containing monomer (A1), the number of carbon atoms in Rf is 1 to 6.

[5]

The surface treatment agent according to [1], wherein the water- and oil-repellent monomer is the fluorine-free monomer (A2).

[6]

The surface treatment agent according to [5], wherein the fluorine-free monomer (A2) is a monomer of the formula:

$$CH_2=C(-X)-C(=O)-Y-R_n$$

wherein X is a hydrogen atom, a monovalent organic group or a halogen atom,

Y is a divalent to tetravalent linking group having at least one group selected from —O— and —NH—, R is a hydrocarbon group having 7 to 40 carbon atoms, and n is an integer of 1 to 3.

[7]

The surface treatment agent according to [6], wherein in the fluorine-free monomer (A2), Y is —Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'— or —Y'—R'—Y'—R'— wherein Y' is a direct bond, —O— or —NH—, and

R' is —$(CH_2)_m$—, wherein m is an integer of 1 to 5, or —$C_6H_6$- (phenylene group).

[8]

The surface treatment agent according to any of [1] to [7], wherein the fluorine-free monomer (A2) is at least one monomer selected from the group consisting of a compound of the formula:

$$CH_2=C(-X^1)-C(=O)-Y^1-R^1$$

wherein $X^1$ is a hydrogen atom, a monovalent organic group or a halogen atom, $Y^1$ is —O— or —NH—, and $R^1$ is a hydrocarbon group having 7 to 40 carbon atoms;

a compound of the formula:

$$CH_2=C(-X^2)-C(=O)-Y^2-Z^1(-Z^2-R^2)_p$$

wherein $X^2$ is a hydrogen atom, a monovalent organic group or a halogen atom, $Y^2$ is —O— or —NH—, $Z^1$ is a direct bond, or a divalent or trivalent hydrocarbon group having 1 to 5 carbon atoms, $Z^2$ each is independently a direct bond, or a divalent to tetravalent linking group having at least one group selected from —O— and —NH—, $R^2$ each is independently a hydrocarbon group having 7 to 40 carbon atoms, and p is 1 or 2; and a compound of the formula:

$$R^{22}-C(=O)-NH-R^{23}-O-R^{21}$$

wherein $R^{21}$ is an organic residue having an ethylenically unsaturated polymerizable group, $R^{22}$ is a hydrocarbon group having 7 to 40 carbon atoms, and $R^{23}$ is a hydrocarbon group having 1 to 5 carbon atoms.

[9]

The surface treatment agent according to [1], wherein the fluorine-containing monomer (A1) is at least one compound selected from the group consisting of $$CH_2=C(-H)-C(=O)-O-(CH_2)_2-C_6F_{13};$$

$$CH_2=C(-CH_3)-C(=O)-O-(CH_2)_2-C_6F_{13};$$
and $$CH_2=C(-Cl)-C(=O)-O-(CH_2)_2-C_6F_{13};$$ and the fluorine-free monomer (A2) is at least one compound selected from the group consisting of stearyl (meth)acrylate and behenyl (meth)acrylate; palmitic acid amidoethyl acrylate and stearic acid amidoethyl acrylate;

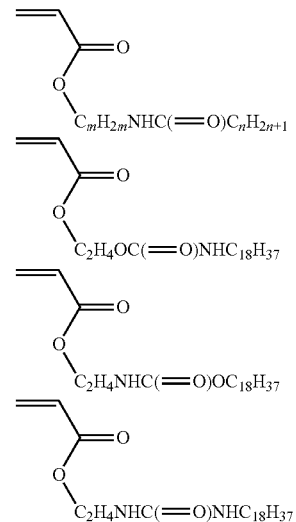

-continued

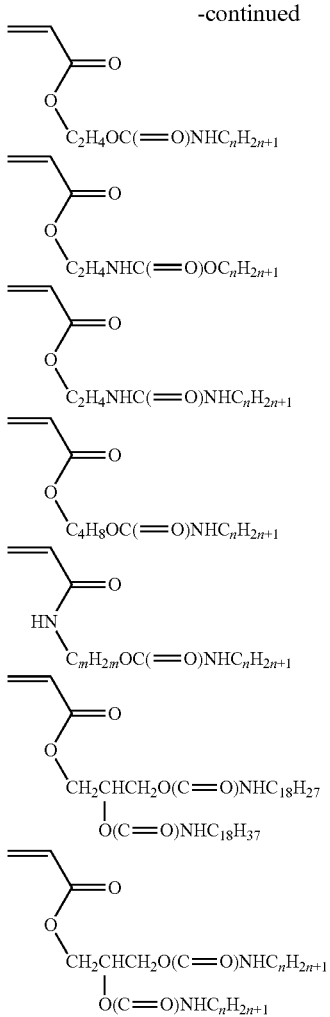

wherein m is an integer of 1 to 5, and n is an integer of 7 to 40, and
a methacrylate having a methyl group at the α-position and an acrylate having a chlorine atom at the α-position in any of the above chemical formulae; and
lauryl (meth)acrylamide, cetyl (meth)acrylamide, stearyl (meth)acrylamide and behenyl (meth)acrylamide.

[10]
The surface treatment agent according to any of [1] to [9], wherein the amount of the water- and oil-repellent polymer (A) is 0.1 to 60 wt % based on the amount of the surface treatment agent, and
the amount of the silicone polymer (B) is 1 to 100 parts by weight based on 100 parts by weight of the water- and oil-repellent polymer (A).

[11]
The surface treatment agent according to any of [1] to [10], wherein the water- and oil-repellent polymer further has at least one selected from the group consisting of a repeating unit derived from a fluorine-free non-crosslinkable monomer (A3), and a repeating unit derived from a fluorine-free crosslinkable monomer (A4).

[12]
The surface treatment agent according to [11], wherein the fluorine-free non-crosslinkable monomer (A3) is at least one compound selected from the group consisting of vinyl chloride, vinyl bromide, vinyl iodide, vinylidene chloride, vinylidene bromide and vinylidene iodide, and
the fluorine-free crosslinkable monomer (A4) is at least one compound selected from the group consisting of diacetone acrylamide, (meth)acrylamide, N-methylolacrylamide, hydroxymethyl (meth)acrylate, hydroxyethyl (meth)acrylate, 3-chloro-2-hydroxypropyl (meth) acrylate, 2-acetoacetoxyethyl (meth)acrylate, N,N-dimethylaminoethyl (meth)acrylate, N,N-diethylaminoethyl (meth)acrylate, butadiene, isoprene, chloroprene and glycidyl (meth)acrylate.

[13]
The surface treatment agent according to any of [1] to [12], wherein in the silicone polymer, none of $R^{51}$ and $R^{53}$ is an alkyl group having 3 to 22 carbon atoms.

[14]
The surface treatment agent according to any of [1] to [13], wherein in the silicone polymer, $R^{51}$ and $R^{53}$ each is independently a methyl group, an ethyl group, or an alkoxy group having 1 to 4 carbon atoms.

[15]
The surface treatment agent according to [11] or [12], wherein the amount of the water- and oil-repellent monomer is 32 to 98 wt % based on the amount of the water- and oil-repellent polymer (A),
the amount of the fluorine-free non-crosslinkable monomer (A3) is 2 to 68 wt % based on the amount of the water- and oil-repellent polymer, and
the amount of the fluorine-free crosslinkable monomer (A4) is 50 parts by weight or less based on 100 parts by weight of the water- and oil-repellent monomer.

[16]
The surface treatment agent according to any of [1] to [13], wherein the surface treatment agent is a water- and oil-repellent agent, a soil resistant agent or a soil release agent.

[17]
An aid for use in a surface treatment agent comprising (A) a water- and oil-repellent polymer having a repeating unit derived from at least one water- and oil-repellent monomer selected from (A1) a fluorine-containing monomer and (A2) a fluorine-free monomer having a hydrocarbon group having 7 to 40 carbon atoms, where the amount of the water- and oil-repellent monomer is 30 to 100 wt % based on the amount of the water- and oil-repellent polymer, the aid comprising (B) a silicone polymer of the formula:

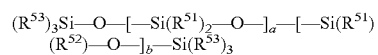

wherein each $R^{51}$ independently represents a hydrogen atom, an alkyl group having 1 to 20 carbon atoms, an aryl group having 6 to 20 carbon atoms, or an alkoxy group having 1 to 4 carbon atoms,
each $R^{52}$ independently represents a saturated hydrocarbon group having 23 to 40 carbon atoms,
each $R^{53}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms,
a represents an integer of 0 or more, b represents an integer of 1 or more, and (a+b) is 10 to 200.

[18]
Use, as an aid, of a silicone polymer of the formula:

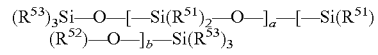

wherein each $R^{51}$ independently represents a hydrogen atom, an alkyl group having 1 to 20 carbon atoms, an aryl group having 6 to 20 carbon atoms, or an alkoxy group having 1 to 4 carbon atoms, each $R^{52}$ independently represents a saturated hydrocarbon group having 23 to 40 carbon atoms, each $R^{53}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms, a represents an integer of 0 or more, b represents an integer of 1 or more, and (a+b) is 10 to 200, the aid being for use in a surface treatment agent comprising (A) a water- and oil-repellent polymer having a repeating unit derived from at least one water- and oil-repellent monomer selected from (A1) a fluorine-containing monomer and (A2) a fluorine-free monomer having a hydrocarbon group having 7 to 40 carbon atoms, where the amount of the water- and oil-repellent monomer is 30 to 100 wt % based on the amount of the water- and oil-repellent polymer.

[19]

A method for producing the surface treatment agent according to any of [1] to [16], the method comprising:
(i) preparing an aqueous dispersion of a water- and oil-repellent polymer (A) by polymerizing in the presence of a liquid medium a monomer containing at least one water- and oil-repellent monomer selected from (A1) a fluorine-containing monomer and (A2) a fluorine-free monomer having a hydrocarbon group having 7 to 40 carbon atoms, the water- and oil-repellent polymer (A) having a repeating unit derived from the water- and oil-repellent monomer in an amount of 30 to 100 wt % based on the amount of the water- and oil-repellent polymer; and
(ii) adding a silicone polymer (B) to the aqueous dispersion of the water- and oil-repellent polymer.

[20]

A method for producing a treated substrate, the method comprising applying to the substrate the surface treatment agent according to any of [1] to [16].

Advantageous Effects of Invention

The surface treatment agent of the present disclosure is free from risk of soiling a cloth due to adherence of a polymer on a roll because sedimentation of particles does not occur.

According to the present disclosure, excellent water-repellency, oil-repellency, antifouling property and soil releasability, particularly excellent water-repellency, can be obtained. Excellent water-repellency, oil-repellency, antifouling property and soil releasability are highly durable.

The surface treatment agent of the present disclosure imparts excellent slip resistance (excellent slippage resistance) to a substrate.

The surface treatment agent of the present disclosure can be used as a water- and oil-repellent agent, a soil resistant agent and/or a soil release agent.

DESCRIPTION OF EMBODIMENTS

A surface treatment agent is generally an aqueous emulsion or an organic solvent solution containing a water- and oil-repellent polymer and a silicone polymer.

The surface treatment agent comprises:
(A) a water- and oil-repellent polymer having a repeating unit derived from one or both of (A1) a fluorine-containing monomer having a fluoroalkyl group and (A2) a fluorine-free monomer having a hydrocarbon group having 7 to 40 carbon atoms (i.e. long-chain hydrocarbon group-containing fluorine-free monomer);
(B) a silicone polymer; and
(C) a liquid medium (A) Water- and Oil-Repellent Polymer The water- and oil-repellent polymer is a homopolymer having a repeating unit derived from a fluorine-containing monomer having a fluoroalkyl group or a fluorine-free monomer having a hydrocarbon group having 7 to 40 carbon atoms (i.e. long-chain hydrocarbon group-containing fluorine-free monomer), a copolymer having a repeating unit derived from two or more monomers selected from fluorine-containing monomers having a fluoroalkyl group and long-chain hydrocarbon group-containing fluorine-free monomers, or a copolymer having a repeating unit derived from a fluorine-containing monomer having a fluoroalkyl group or a long-chain hydrocarbon group-containing fluorine-free monomer, and a repeating unit derived from another polymerizable compound which is copolymerizable therewith.

The water- and oil-repellent polymer is a fluorine-containing polymer, or a fluorine-free polymer free from fluorine atom. The fluorine-containing polymer is a polymer having a repeating unit derived from a fluorine-containing monomer having a fluoroalkyl group. The fluorine-free polymer is a polymer having a repeating unit derived from a long-chain hydrocarbon group-containing fluorine-free monomer.

The water- and oil-repellent polymer may be a random polymer, or a block polymer.

In the present disclosure, the water- and oil-repellent polymer (A) may consist of (A1) a repeating unit derived from a fluorine-containing monomer having a fluoroalkyl group and/or (A2) a repeating unit derived from a long-chain hydrocarbon group-containing fluorine-free monomer, and it is preferable that the water- and oil-repellent polymer (A) have one or both of (A3) a repeating unit derived from a fluorine-free non-crosslinkable monomer and (A4) a repeating unit derived from a fluorine-free crosslinkable monomer, in addition to the repeating unit (A1) and/or the repeating unit (A2).

The water- and oil-repellent polymer (A) has a repeating unit or repeating units derived from one or both of (A1) a fluorine-containing monomer having a fluoroalkyl group and (A2) a long-chain hydrocarbon group-containing fluorine-free monomer. That is, the water- and oil-repellent polymer (A) has one or both of (A1) a repeating unit derived from a fluorine-containing monomer having a fluoroalkyl group and (A2) a repeating unit derived from a long-chain hydrocarbon group-containing fluorine-free monomer.

(A1) Fluorine-Containing Monomer

The fluorine-containing monomer is generally a polymerizable compound having a perfluoroalkyl group or a perfluoroalkenyl group and an acrylic acid group, a methacrylic acid group or an α-substituted acrylic acid group.

The fluorine-containing monomer (A1) is preferably a compound of the formula:

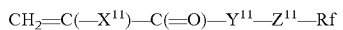

wherein $X^{11}$ is a hydrogen atom, a monovalent organic group or a halogen atom, $Y^{11}$ is —O— or —NH—, $Z^{11}$ is a direct bond or a divalent organic group, and Rf is a fluoroalkyl group having 1 to 20 carbon atoms.

$Z^{11}$ may be, for example, a linear or branched aliphatic group having 1 to 20 carbon atoms (particularly an alkylene group), for example a group of the formula: —$(CH_2)_x$— (wherein x is 1 to 10), or a group of the formula: —$R^2(R^1)$N—$S_2$— or the formula: —$R^2(R^1)$N—CO— (wherein $R^1$ is an alkyl group having 1 to 10 carbon atoms and $R^2$ is a linear or branched alkylene group having 1 to 10 carbon atoms), or a group of the formula: —$CH_2CH(OR^3)CH_2$—$(Ar—O)_p$— (wherein $R^3$ represents a hydrogen atom or an acyl group having 1 to 10 carbon atoms (e.g. formyl or acetyl), Ar represents an arylene group optionally having a substituent and p represents 0 or 1), or a group of the formula: —$CH_2$—Ar—$(O)_q$ (wherein Ar is an arylene group optionally having a substituent, and q is 0 or 1), or a group —$(CH_2)_m$—$SO_2$—$(CH_2)_n$— or a group —$(CH_2)_m$—S—$(CH_2)_n$— (wherein m is 1 to 10 and n is 0 to 10).

Specific examples of $X^{11}$ include H, $CH_3$, Cl, Br, I, F, CN and $CF_3$. $X^{11}$ is preferably a methyl group or a chlorine atom, particularly a chlorine atom.

The fluorine-containing monomer is preferably an acrylate ester or acrylamide of the general formula: $CH_2$=C(—$X^{11}$)—C(=O)—$Y^{11}$—$Z^{11}$—Rf wherein $X^{11}$ is a hydrogen atom, a linear or branched alkyl group having 1 to 21 carbon atoms, a fluorine atom, a chlorine atom, a bromine atom, an iodine atom, a $CFX^1X^2$ group (wherein $X^1$ and $X^2$ are each a hydrogen atom, a fluorine atom, a chlorine atom, a bromine atom or an iodine atom), a cyano group, a linear or branched fluoroalkyl group having 1 to 21 carbon atoms, a substituted or unsubstituted benzyl group, or a substituted or unsubstituted phenyl group;

$Y^{11}$ is —O— or —NH—;

$Z^{11}$ is a direct bond, an aliphatic group having 1 to 10 carbon atoms, an aromatic group or a cycloaliphatic group having 6 to 18 carbon atoms, a group —$CH_2CH_2N(R^1)SO_2$— (wherein $R^1$ is an alkyl group having 1 to 4 carbon atoms), a group —$CH_2CH(OZ^1)CH_2$—$(Ph-O)_p$— (wherein $Z^1$ is a hydrogen atom or an acetyl group, Ph is a phenylene group and p is 0 or 1), a group —$(CH_2)_n$-Ph-O— (wherein Ph is a phenylene group and n is 0 to 10), a group —$(CH_2)_m$—$SO_2$—$(CH_2)_n$— or a group —$(CH_2)_m$—S—$(CH_2)_n$— (wherein m is 1 to 10 and n is 0 to 10); and Rf is a linear or branched fluoroalkyl group having 1 to 20 carbon atoms.

In the fluorine-containing monomer, the Rf group is preferably a perfluoroalkyl group. The number of carbon atoms in the Rf group is preferably 1 to 12, for example 1 to 6, particularly 4 to 6, especially 6. Examples of the Rf group include —$CF_3$, —$CF_2CF_3$, —$CF_2CF_2CF_3$, —$CF(CF_3)_2$, —$CF_2CF_2CF_2CF_3$, —$CF_2CF(CF_3)_2$, —$C(CF_3)_3$, —$(CF_2)_4CF_3$, —$(CF_2)_2CF(CF_3)_2$, —$CF_2C(CF_3)_3$, —$CF(CF_3)$ $CF_2CF_2CF_3$, —$(CF_2)_5CF_3$, —$(CF_2)_3CF(CF_3)_2$, —$(CF_2)_4CF(CF_3)$ 2 and —$C_8F_{17}$.

$Z^{11}$ is preferably an aliphatic group having 1 to 10 carbon atoms, an aromatic group or a cycloaliphatic group having 6 to 18 carbon atoms, a group —$CH_2CH_2N(R^1)SO_2$— (wherein $R^1$ is an alkyl group having 1 to 4 carbon atoms), a group —$CH_2CH(OZ^1)CH_2$—$(Ph-O)_p$— (wherein $Z^1$ is a hydrogen atom or an acetyl group, Ph is a phenylene group and p is 0 or 1), a group —$(CH_2)_n$-Ph-O— (wherein Ph is a phenylene group and n is 0 to 10), or a group —$(CH_2)_m$—$SO_2$—$(CH_2)_n$— or a group —$(CH_2)_m$—S—$(CH_2)_n$— (wherein m is 1 to 10 and n is 0 to 10). The aliphatic group is preferably an alkylene group (particularly the number of carbon atoms is 1 to 4, for example 1 or 2). The aromatic group or the cycloaliphatic group may be substituted or unsubstituted. The S group or the $SO_2$ group may be directly bonded to the Rf group.

Specific examples of the fluorine-containing monomer include, but are not limited to, those shown below.

$CH_2$=C(—H)—C(=O)—O—$(CH_2)_2$—Rf $CH_2$=C(—H)—C(=O)—O—$C_6H_4$—Rf $CH_2$=C(—Cl)—C(=O)—O—$(CH_2)_2$—Rf $CH_2$=C(—H)—C(=O)—O—$(CH_2)_2$N(—$CH_3$)$SO_2$—Rf $CH_2$=C(—H)—C(=O)—O—$(CH_2)_2$N(—$C_2H_5$)$SO_2$—Rf $CH_2$=C(—H)—C(=O)—O—$CH_2CH$(—OH)$CH_2$—Rf $CH_2$=C(—H)—C(=O)—O—$CH_2CH$(—$OCOCH_3$)$CH_2$—Rf $CH_2$=C(—H)—C(=O)—O—$(CH_2)_2$—S—Rf $CH_2$=C(—H)—C(=O)—O—$(CH_2)_2$—S—$(CH_2)_2$—Rf $CH_2$=C(—H)—C(=O)—O—$(CH_2)_3$—$SO_2$—Rf $CH_2$=C(—H)—C(=O)—O—$(CH_2)_2$—$SO_2$—$(CH_2)_2$—Rf $CH_2$=C(—H)—C(=O)—NH—$(CH_2)_2$—Rf $CH_2$=C(—$CH_3$)—C(=O)—O—$(CH_2)_2$—S—Rf $CH_2$=C(—$CH_3$)—C(=O)—O—$(CH_2)_2$—S—$(CH_2)_2$—Rf $CH_2$=C(—$CH_3$)—C(=O)—O—$(CH_2)_3$—$SO_2$—Rf $CH_2$=C(—$CH_3$)—C(=O)—O—$(CH_2)_2$—$SO_2$—$(CH_2)_2$—Rf $CH_2$=C(—$CH_3$)—C(=O)—NH—$(CH_2)_2$—Rf $CH_2$=C(—F)—C(=O)—O—$(CH_2)_2$—S—Rf $CH_2$=C(—F)—C(=O)—O—$(CH_2)_2$—S—$(CH_2)_2$—Rf $CH_2$=C(—F)—C(=O)—O—$(CH_2)_2$—$SO_2$—Rf $CH_2$=C(—F)—C(=O)—O—$(CH_2)_2$—$SO_2$—$(CH_2)_2$—Rf $CH_2$=C(—F)—C(=O)—NH—$(CH_2)_2$—Rf $CH_2$=C(—Cl)—C(=O)—O—$(CH_2)_2$—S—Rf $CH_2$=C(—Cl)—C(=O)—O—$(CH_2)_2$—S—$(CH_2)_2$—Rf $CH_2$=C(—Cl)—C(=O)—O—$(CH_2)_2$—$SO_2$—Rf $CH_2$=C(—Cl)—C(=O)—O—$(CH_2)_2$—$SO_2$—$(CH_2)_2$—Rf $CH_2$=C(—Cl)—C(=O)—NH—$(CH_2)_2$—Rf $CH_2$=C(—$CF_3$)—C(=O)—O—$(CH_2)_2$—S—Rf

CH$_2$=C(—CF$_3$)—C(=O)—O—(CH$_2$)$_2$—S—(CH$_2$)$_2$—Rf

CH$_2$=C(—CF$_3$)—C(=O)—O—(CH$_2$)$_2$—SO$_2$—Rf

CH$_2$=C(—CF$_3$)—C(=O)—O—(CH$_2$)$_2$—SO$_2$—(CH$_2$)$_2$—Rf

CH$_2$=C(—CF$_3$)—C(=O)—NH—(CH$_2$)$_2$—Rf

CH$_2$=C(—CF$_2$H)—C(=O)—O—(CH$_2$)$_2$—S—Rf

CH$_2$=C(—CF$_2$H)—C(=O)—O—(CH$_2$)$_2$—S—(CH$_2$)$_2$—Rf

CH$_2$=C(—CF$_2$H)—C(=O)—O—(CH$_2$)$_2$—SO$_2$—Rf

CH$_2$=C(—CF$_2$H)—C(=O)—O—(CH$_2$)$_2$—SO$_2$—(CH$_2$)$_2$—Rf

CH$_2$=C(—CF$_2$H)—C(=O)—NH—(CH$_2$)$_2$—Rf

CH$_2$=C(—CN)—C(=O)—O—(CH$_2$)$_2$—S—Rf

CH$_2$=C(—CN)—C(=O)—O—(CH$_2$)$_2$—S—(CH$_2$)$_2$—Rf

CH$_2$=C(—CN)—C(=O)—O—(CH$_2$)$_2$—SO$_2$—Rf

CH$_2$=C(—CN)—C(=O)—O—(CH$_2$)$_2$—SO$_2$—(CH$_2$)$_2$—Rf

CH$_2$=C(—CN)—C(=O)—NH—(CH$_2$)$_2$—Rf

CH$_2$=C(—CF$_2$CF$_3$)—C(=O)—O—(CH$_2$)$_2$—S—Rf

CH$_2$=C(—CF$_2$CF$_3$)—C(=O)—O—(CH$_2$)$_2$—S—(CH$_2$)$_2$—Rf

CH$_2$=C(—CF$_2$CF$_3$)—C(=O)—O—(CH$_2$)$_2$—SO$_2$—Rf

CH$_2$=C(—CF$_2$CF$_3$)—C(=O)—O—(CH$_2$)$_2$—SO$_2$—(CH$_2$)$_2$—Rf

CH$_2$=C(—CF$_2$CF$_3$)—C(=O)—NH—(CH$_2$)$_2$—Rf

CH$_2$=C(—F)—C(=O)—O—(CH$_2$)$_3$—S—Rf

CH$_2$=C(—F)—C(=O)—O—(CH$_2$)$_3$—S—(CH$_2$)$_2$—Rf

CH$_2$=C(—F)—C(=O)—O—(CH$_2$)$_3$—SO$_2$—Rf

CH$_2$=C(—F)—C(=O)—O—(CH$_2$)$_3$—SO$_2$—(CH$_2$)$_2$—Rf

CH$_2$=C(—F)—C(=O)—NH—(CH$_2$)$_3$—Rf

CH$_2$=C(—Cl)—C(=O)—O—(CH$_2$)$_3$—S—Rf

CH$_2$=C(—Cl)—C(=O)—O—(CH$_2$)$_3$—S—(CH$_2$)$_2$—Rf

CH$_2$=C(—Cl)—C(=O)—O—(CH$_2$)$_3$—SO$_2$—Rf

CH$_2$=C(—Cl)—C(=O)—O—(CH$_2$)$_3$—SO$_2$—(CH$_2$)$_2$—Rf

CH$_2$=C(—CF$_3$)—C(=O)—O—(CH$_2$)$_3$—S—Rf

CH$_2$=C(—CF$_3$)—C(=O)—O—(CH$_2$)$_3$—S—(CH$_2$)$_2$—Rf

CH$_2$=C(—CF$_3$)—C(=O)—O—(CH$_2$)$_3$—SO$_2$—Rf

CH$_2$=C(—CF$_3$)—C(=O)—O—(CH$_2$)$_3$—SO$_2$—(CH$_2$)$_2$—Rf

CH$_2$=C(—CF$_2$H)—C(=O)—O—(CH$_2$)$_3$—S—Rf

CH$_2$=C(—CF$_2$H)—C(=O)—O—(CH$_2$)$_3$—S—(CH$_2$)$_2$—Rf

CH$_2$=C(—CF$_2$H)—C(=O)—O—(CH$_2$)$_3$—SO$_2$—Rf

CH$_2$=C(—CF$_2$H)—C(=O)—O—(CH$_2$)$_3$—SO$_2$—(CH$_2$)$_2$—Rf

CH$_2$=C(—CN)—C(=O)—O—(CH$_2$)$_3$—S—Rf

CH$_2$=C(—CN)—C(=O)—O—(CH$_2$)$_3$—S—(CH$_2$)$_2$—Rf

CH$_2$=C(—CN)—C(=O)—O—(CH$_2$)$_3$—SO$_2$—Rf

CH$_2$=C(—CN)—C(=O)—O—(CH$_2$)$_3$—SO$_2$—(CH$_2$)$_2$—Rf

CH$_2$=C(—CF$_2$CF$_3$)—C(=O)—O—(CH$_2$)$_3$—S—Rf

CH$_2$=C(—CF$_2$CF$_3$)—C(=O)—O—(CH$_2$)$_3$—S—(CH$_2$)$_2$—Rf

CH$_2$=C(—CF$_2$CF$_3$)—C(=O)—O—(CH$_2$)$_3$—SO$_2$—Rf

CH$_2$=C(—CF$_2$CF$_3$)—C(=O)—O—(CH$_2$)$_2$—SO$_2$—(CH$_2$)$_2$—Rf wherein Rf is a fluoroalkyl group having 1 to 20 carbon atoms.

(A2) Long-Chain Hydrocarbon Group-Containing Fluorine-Free Monomer

The long-chain hydrocarbon group-containing fluorine-free monomer does not have fluoroalkyl group. The long-chain hydrocarbon group-containing fluorine-free monomer does not contain a fluorine atom.

The long-chain hydrocarbon group is a saturated or unsaturated group. The long-chain hydrocarbon group is preferably a saturated hydrocarbon group, particularly an alkyl group.

The long-chain hydrocarbon group is preferably a linear or branched hydrocarbon group having 7 to 40 carbon atoms. The number of carbon atoms in the linear or branched hydrocarbon group may be 10 to 40, 12 to 40 or 18 to 40. The linear or branched hydrocarbon group has preferably 12 to 40, more preferably 12 to 30, particularly preferably 18 to 28, especially preferably 18 to 22 (or 18 to 24) carbon atoms, and is preferably a saturated aliphatic hydrocarbon group in general, particularly an alkyl group. The long-chain hydrocarbon group is particularly preferably a stearyl group, an icosyl group or a behenyl group.

The long-chain hydrocarbon group-containing fluorine-free monomer is preferably a monomer of the formula:

CH$_2$=C(—X)—C(=O)—Y—R$_n$ wherein X is a hydrogen atom, a monovalent organic group or a halogen atom, Y is a divalent to tetravalent linking group having at least one group selected from —O— and —NH—, R is a hydrocarbon group having 7 to 40 carbon atoms, and n is an integer of 1 to 3.

X may be a hydrogen atom, a methyl group, a halogen except for a fluorine atom, a substituted or unsubstituted benzyl group, or a substituted or unsubstituted phenyl group.

Examples of X include a hydrogen atom, a methyl group, a chlorine atom, a bromine atom, an iodine atom and a cyano group. X is preferably a hydrogen atom, a methyl group or a chlorine atom.

Y is a divalent to tetravalent group. Y is preferably a divalent group.

Y is preferably a group containing at least one selected from a hydrocarbon group having 1 carbon atom, —$C_6H_6$—, —O—, —C(=O)—, —S(C=O)$_2$ and —NH— (wherein Y is not a hydrocarbon group). Examples of the hydrocarbon group having 1 carbon atom include —$CH_2$—, —CH= and —C≡.

Examples of Y include —Y'—, —Y'—C(=O)—, —C(=O)—Y'—, —Y'—C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'— and Y'—R'—Y'—R'— wherein Y' is a direct bond, —O— or —NH—,

R' is —$(CH_2)_m$— (wherein m is an integer of 1 to 5) or —$C_6H_6$-(phenylene group).

Specific examples of Y include —O—, —NH—, —O—C(=O)—, —C(=O)—NH—, —NH—C(=O)—, —O—C(=O)—NH—, —NH—C(=O)—O—, —NH—C(=O)—NH—, —O—$C_6H_6$—, —O—$(CH_2)_m$—O—, —NH—$(CH_2)_m$—NH—, —O—$(CH_2)_m$—NH—, —NH—$(CH_2)_m$—O—, —O—$(CH_2)_m$—O—C(=O)—, —O—$(CH_2)_m$—C(=O)—O—, —NH—$(CH_2)_m$—O—C(=O)—, —NH—$(CH_2)_m$—C(=O)—O—, —O—$(CH_2)_m$—O—C(=O)—NH—, —O—$(CH_2)_m$—NH—C(=O)—O—, —$(CH_2)_m$—C(=O)—NH—, —$(CH_2)_m$—NH—C(=O)—, —O—$(CH_2)_m$—NH—C(=O)—NH—, —O—$(CH_2)_m$—O—$C_6H_6$—, —NH—$(CH_2)_m$—O—C(=O)—NH—, —NH—$(CH_2)_m$—NH—C(=O)—O—, —NH—$(CH_2)_m$—C(=O)—NH—, —NH—$(CH_2)_m$—NH—C(=O)—, —NH—$(CH_2)_m$—NH—C(=O)—NH—, —NH—$(CH_2)_m$—O—$C_6H_6$—, —NH—$(CH_2)_m$—NH—$C_6H_6$— wherein m is an integer of 1 to 5, particularly 2 or 4.

Y is more preferably —O—, —NH—, —O—$(CH_2)_m$—O—C(=O)—, —O—$(CH_2)_m$—NH—C(=O)—, —O—$(CH_2)_m$—O—C(=O)—NH—, —O—$(CH_2)_m$—NH—C(=O)—O—, —O—$(CH_2)_m$—NH—C(=O)—NH— wherein m is an integer of 1 to 5, particularly 2 or 4. Y is particularly preferably —O—$(CH_2)_m$—NH—C(=O)—.

Y is particularly preferably —O—, —NH—, —O—$(CH_2)_m$—NH—C(=O)—, —O—$(CH_2)_m$—O—C(=O)—NH—, —O—$(CH_2)_m$—NH—C(=O)—O—, —O—$(CH_2)_m$—NH—C(=O)—NH— wherein m is an integer of 1 to 5, particularly 2 or 4.

R is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms in the hydrocarbon group is preferably 12 to 30, for example 16 to 26, particularly 18 to 22.

n is an integer of 1 to 3, preferably 1.

When Y has a tetravalent hydrocarbon group having 1 carbon atom, n is preferably 3. When Y has a trivalent hydrocarbon group having 1 carbon atom, n is preferably 2. When Y does not have a trivalent or tetravalent hydrocarbon group having 1 carbon atom, n is 1.

Examples of the long-chain hydrocarbon group-containing fluorine-free monomer (A2) include (a1) an acrylic monomer in which C(=O)—O— or C(=O)—NH— is directly bonded to a hydrocarbon group having 7 to 40 carbon atoms, and (a2) an acrylic monomer in which C(=O)—O— or C(=O)—NH— is not directly bonded to a hydrocarbon group having 7 to 40 carbon atoms.

The acrylic monomer (a2) is a compound different from the acrylic monomer (a1).

The acrylic monomer (a2) may be a (meth)acrylate or (meth)acrylamide having an amide group, a urethane group or a urea group (which is not directly bonded to C(=O)—O— or C(=O)—NH— and which is directly bonded to a hydrocarbon group having 7 to 40 carbon atoms). The nitrogen-containing monomer is preferably an acrylate having an amide group which is not directly bonded to C(=O)—O— or C(=O)—NH— and which is directly bonded to a hydrocarbon group having 7 to 40 carbon atoms.

(a1) Acrylic Monomer

The acrylic monomer (a1) is preferably a compound of the formula:

$$CH_2=C(-X^1)-C(=O)-Y^1-R^1$$

wherein $X^1$ is a hydrogen atom, a monovalent organic group or a halogen atom, $Y^1$ is —O— or —NH—, and $R^1$ is a hydrocarbon group having 7 to 40 carbon atoms.

The acrylic monomer (a1) is a long-chain acrylate ester monomer in which $Y^1$ is —O—; or a long-chain acrylamide monomer in which $Y^1$ is —NH—.

$X^1$ may be a hydrogen atom, a methyl group, a halogen except for a fluorine atom, a substituted or unsubstituted benzyl group or a substituted or unsubstituted phenyl group. Examples of $X^1$ include a hydrogen atom, a methyl group, a chlorine atom, a bromine atom, an iodine atom and a cyano group. $X^1$ is preferably a hydrogen atom, a methyl group or a chlorine atom.

$Y^1$ is —O— or —NH—.

R is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms in the hydrocarbon group is preferably 12 to 30, for example 16 to 26, particularly 18 to 22 (or 18 to 24).

Specific examples of the long-chain acrylate ester monomer include lauryl (meth)acrylate, stearyl (meth)acrylate, icosyl (meth)acrylate, behenyl (meth)acrylate, stearyl α-chloroacrylate, icosyl α-chloroacrylate and behenyl α-chloroacrylate.

Specific examples of the long-chain acrylamide monomer include lauryl (meth)acrylamide, stearyl (meth)acrylamide, icosyl (meth)acrylamide and behenyl (meth)acrylamide.

Presence of a long-chain acrylate ester monomer or a long-chain acrylamide monomer enhances water-repellency, oil-repellency and feeling which are imparted by the water- and oil-repellent polymer.

(a2) Acrylic Monomer

The acrylic monomer (a2) may be a (meth)acrylate or (meth)acrylamide in which a divalent to tetravalent linking group having at least one group selected from —O— and —NH— is present between C(=O)—O— or C(=O)—NH— and a hydrocarbon group having 7 to 40 carbon atoms.

The acrylic monomer (a2) is preferably a compound of the formula:

$$CH_2=C(-X^2)-C(=O)-Y^2-Z^1(-Z^2-R^2)_p$$

wherein $X^2$ is a hydrogen atom, a monovalent organic group or a halogen atom, $Y^2$ is —O— or —NH—, $Z^1$ is a direct bond, or a divalent or trivalent hydrocarbon group having 1 to 5 carbon atoms, $Z^2$ each is independently a direct bond, or a divalent to tetravalent linking group having at least one group selected from —O— and —NH—, $R^2$ each is independently a hydrocarbon group having 7 to 40 carbon atoms, and p is 1 or 2.

The acrylic monomer (a2) is a long-chain acrylate ester monomer in which $Y^2$ is —O—; or a long-chain acrylamide monomer in which $Y^2$ is —NH—.

$X^2$ may be a hydrogen atom, a methyl group, a halogen except for a fluorine atom, a substituted or unsubstituted benzyl group or a substituted or unsubstituted phenyl group. Examples of $X^2$ include a hydrogen atom, a methyl group, a chlorine atom, a bromine atom, an iodine atom and a cyano group. The crystallinity of the side chain is less likely to be hindered as the main chain of the resulting polymer is less rigid, and thus, $X^2$ is preferably a hydrogen atom, a methyl group or a chlorine atom, more preferably a hydrogen atom or a methyl group, particularly preferably a hydrogen atom.

$Y^2$ is —O— or —NH—.

$Z^1$ is a direct bond, or a divalent or trivalent hydrocarbon group having 1 to 5 carbon atoms (particularly an alkyl group). For example, $Z^1$ may have a branched structure. The number of carbon atoms of $Z^1$ is preferably 2 to 4, particularly 2. Specific examples of $Z^1$ include a direct bond; —CH$_2$—, —CH$_2$CH$_2$—, —CH$_2$CH$_2$CH$_2$—, —CH$_2$CH$_2$CH$_2$CH$_2$— and —CH$_2$CH$_2$CH$_2$CH$_2$CH$_2$— as divalent groups; and —CH$_2$CH=, —CH$_2$(CH—)CH$_2$—, —CH$_2$CH$_2$CH=, —CH$_2$CH$_2$CH$_2$CH$_2$CH=, —CH$_2$CH$_2$(CH—)—CH$_2$— and —CH$_2$CH$_2$CH$_2$CH= as trivalent groups having a branched structure. Preferably, $Z^1$ is not a direct bond.

Specific examples of $Z^2$ include a direct bond, —O—, —NH—, —(O)$_k$—C(=O)—, —C(=O)—O—, —C(=O)—NH—, —NH—C(=O)—, —(O)$_k$—C(=O)—NH—, —NH—C(=O)—O—, —NH—C(=O)—NH—, —(O)$_k$—C$_6$H$_6$—, —(O)$_k$—(CH$_2$)$_m$—O—, —NH—(CH$_2$)$_m$—NH—, —(O)$_k$—(CH$_2$)$_m$—NH—, —NH—(CH$_2$)$_m$—O—, —(O)$_k$—(CH$_2$)$_m$—O—C(=O)—, —(O)$_k$—(CH$_2$)$_m$—C(=O)—O—, —NH—(CH$_2$) m-O—C(=O)—, —NH—(CH$_2$)$_m$—C(=O)—O—, —(O)$_k$—(CH$_2$)$_m$—O—C(=O)—NH—, —(O)$_k$—(CH$_2$)$_m$—NH—C(=O)—O—, —(O)$_k$—(CH$_2$)$_m$—C(=O)—NH—, —(O)$_k$—(CH$_2$)$_m$—NH—C(=O)—, —(O)$_k$—(CH$_2$)$_m$—NH—C(=O)—NH—, —(O)$_k$—(CH$_2$)$_m$—O—C$_6$H$_6$—, —NH—(CH$_2$)$_m$—O—C(=O)—NH—, —NH—(CH$_2$)$_m$—NH—C(=O)—O—, —NH—(CH$_2$)$_m$—C(=O)—NH—, —NH—(CH$_2$)$_m$—NH—C(=O)—, —NH—(CH$_2$)$_m$—NH—C(=O)—NH—, —NH—(CH$_2$)$_m$—O—C$_6$H$_6$— and —NH—(CH$_2$)$_m$—NH—C$_6$H$_6$— wherein k is 0 or 1, and m is an integer of 1 to 5, particularly 2 or 4.

$Z^2$ is particularly preferably —(O)$_k$—, —NH—, —(O)$_k$—(CH$_2$)$_m$—O—C(=O)—, —(O)$_k$—(CH$_2$), —NH—C(=O)—, —(O)$_k$—(CH$_2$), —O—C(=O)—NH—, —(O)$_k$—(CH$_2$)$_m$—NH—C(=O)—O—, —(O)$_k$—(CH$_2$)$_m$—NH—C(=O)—NH— wherein k is 0 or 1, and m is an integer of 1 to 5, particularly 2 or 4.

Both $Z^1$ and $Z^2$ are not simultaneously direct bonds.

$R^2$ is preferably a linear or branched hydrocarbon group. The hydrocarbon group may be particularly a linear hydrocarbon group. The hydrocarbon group is preferably an aliphatic hydrocarbon group, particularly a saturated aliphatic hydrocarbon group, especially an alkyl group. The number of carbon atoms in the hydrocarbon group is preferably 12 to 30, for example 16 to 26, particularly 18 to 22 (or 18 to 24).

The acrylic monomer (a2) is preferably CH$_2$=C(—X$^2$)—C(=O)—O—(CH$_2$)$_m$—NH—C(=O)—R$^2$, CH$_2$=C(—X$^2$)—C(=O)—O—R$^2$ or a combination thereof [wherein X$^2$, m and R$^2$ have the same meaning as described above]. The acrylic monomer (a2) is particularly preferably CH$_2$=C(—X$^2$)—C(=O)—O—(CH$_2$)$_m$—NH—C(=O)—R$^2$.

The acrylic monomer (a2) can be produced by reacting a hydroxyalkyl (meth)acrylate or a hydroxyalkyl (meth)acrylamide with a long-chain alkyl isocyanate. Examples of the long-chain alkyl isocyanate include lauryl isocyanate, myristyl isocyanate, cetyl isocyanate, stearyl isocyanate, oleyl isocyanate and behenyl isocyanate.

Alternatively, the acrylic monomer (a2) can be produced by reacting a long-chain alkylamine or a long-chain alkyl alcohol with a (meth)acrylate having an isocyanate group on the side chain, for example 2-methacryloyloxyethyl isocyanate. Examples of the long-chain alkylamine include laurylamine, myristylamine, cetylamine, stearylamine, oleylamine and behenylamine. Examples of the long-chain alkyl alcohol include lauryl alcohol, myristyl alcohol, cetyl alcohol, stearyl alcohol, oleyl alcohol and behenyl alcohol.

Specific examples of the acrylic monomer (a2) are as follows. The compounds of the following formulae are acrylates having a hydrogen atom at the α-position, and specific examples also include methacrylates having a methyl group at the α-position, and acrylates having a chlorine atom at the α-position.

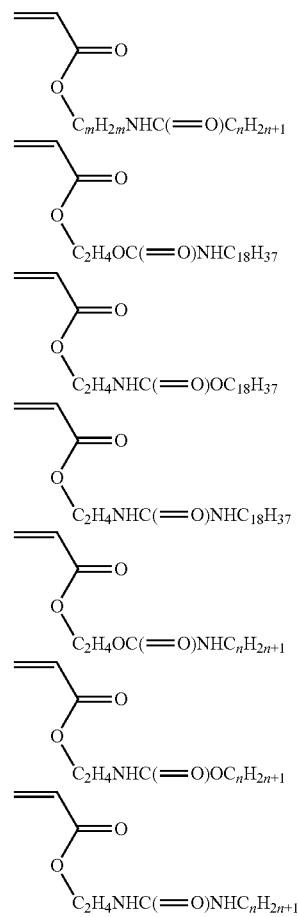

-continued

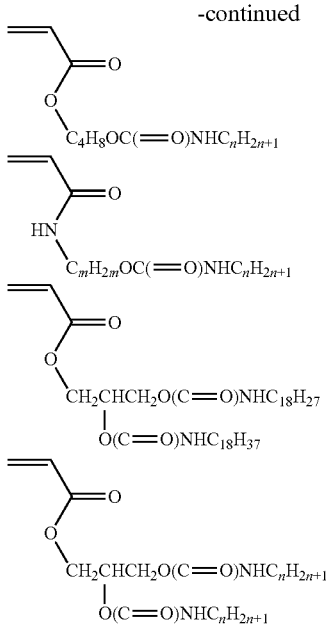

wherein m is an integer of 1 to 5, n is an integer of 7 to 40, and methacrylates having a methyl group at the α-position and acrylates having a chlorine atom at the α-position in the above chemical formulae.

Typical specific examples of the acrylic monomer (a2) include palmitic acid amidoethyl (meth)acrylate, stearic acid amidoethyl (meth)acrylate, behenic acid amidoethyl (meth)acrylate and myristic acid amidoethyl (meth)acrylate.

The acrylic monomer (a2) is particularly preferably an amide group-containing monomer of the formula:

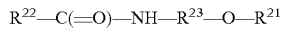

$R^{22}-C(=O)-NH-R^{23}-O-R^{21}$ wherein $R^{21}$ is an organic residue having an ethylenically unsaturated polymerizable group, $R^{22}$ is a hydrocarbon group having 7 to 40 carbon atoms, and $R^{23}$ is a hydrocarbon group having 1 to 5 carbon atoms.

$R^{21}$ is an organic residue having an ethylenically unsaturated polymerizable group, and is not limited as long as the group has a carbon-carbon double bond. Specific examples thereof include organic residues having ethylenically unsaturated polymerizable groups such as —C(=)CR$^{24}$=CH$_2$, —CHR$^{24}$=CH$_2$ and —CH$_2$CHR$^{24}$=CH$_2$, where $R^{24}$ is a hydrogen atom or an alkyl group having 1 to 4 carbon atoms. $R^{21}$ may have any of various organic groups in addition to an ethylenically unsaturated polymerizable group, and examples thereof include organic groups such as chain hydrocarbons, cyclic hydrocarbons, polyoxyalkylene groups and polysiloxane groups. For example, these organic groups may be substituted with various substituents. $R^{21}$ is preferably —C(=)CR$_{24}$=CH$_2$.

$R^{22}$ is a hydrocarbon group having 7 to 40 carbon atoms, preferably an alkyl group having 7 to 40 carbon atoms, and examples thereof include chain hydrocarbons and cyclic hydrocarbons. Among them, chain hydrocarbons are preferable, and linear saturated hydrocarbon groups are particularly preferable. The number of carbon atoms of $R^{21}$ is 7 to 40, preferably 11 to 27, particularly 15 to 23.

$R^{23}$ is a hydrocarbon group having 1 to 5 carbon atoms, preferably an alkyl group having 1 to 5 carbon atoms. For example, the hydrocarbon group having 1 to 5 carbon atoms may be linear or branched, and may have an unsaturated bond. The hydrocarbon group is preferably linear. The number of carbon atoms of $R^{23}$ is preferably 2 to 4, particularly 2. $R^{23}$ is preferably an alkylene group.

The amide group-containing monomer may be one having a single group as $R^{21}$ (e.g. only a compound in which $R^{21}$ has 17 carbon atoms), or one having a combination of a plurality of groups as $R^{21}$ (e.g. a mixture of a compound in which $R^{21}$ has 17 carbon atoms and a compound in which $R^{21}$ has 15 carbon atoms).

Examples of the amide group-containing monomer include carboxylic acid amidealkyl (meth)acrylates.

Specific examples of the amide group-containing monomer include palmitic acid amidoethyl (meth)acrylate, stearic acid amidoethyl (meth)acrylate, behenic acid amidoethyl (meth)acrylate, myristic acid amidoethyl (meth)acrylate, lauric acid amidoethyl (meth)acrylate, isostearic acid ethylamide (meth)acrylate, oleic acid ethylamide (meth)acrylate, tertiary butylcyclohexyl caproic acid amidoethyl (meth)acrylate, adamantanecarboxylic acid ethylamide (meth)acrylate, naphthalenecarboxylic acid amidoethyl (meth)acrylate, anthracenecarboxylic acid amidoethyl (meth)acrylate, palmitic acid amidopropyl (meth)acrylate, stearic acid amidopropyl (meth)acrylate, palmitic acid amidoethyl vinyl ether, stearic acid amidoethyl vinyl ether, palmitic acid amidoethyl allyl ether, stearic acid amidoethyl allyl ether and mixtures thereof.

The amide group-containing monomer is preferably stearic acid amidoethyl (meth)acrylate. The amide group-containing monomer may be a mixture containing stearic acid amidoethyl (meth)acrylate. In the mixture containing stearic acid amidoethyl (meth)acrylate, the amount of the stearic acid amidoethyl (meth)acrylate may be, for example, 55 to 99 wt %, preferably 60 to 85 wt %, more preferably 65 to 80 wt %, based on the weight of all amide group-containing monomers, and the other monomers may be, for example, palmitic acid amidoethyl (meth)acrylate.

(A3) Fluorine-Free Non-Crosslinkable Monomer

The fluorine-free non-crosslinkable monomer (A3) is a monomer other than the long-chain hydrocarbon group-containing fluorine-free monomer (A2). The fluorine-free non-crosslinkable monomer (A3) is a monomer which does not contain a fluorine atom. The fluorine-free non-crosslinkable monomer (A3) has no crosslinkable functional group. The fluorine-free non-crosslinkable monomer (A3) is non-crosslinkable unlike the crosslinkable monomer (A4). The fluorine-free non-crosslinkable monomer (A3) is preferably a fluorine-free monomer having an ethylenically unsaturated carbon-carbon double bond. The fluorine-free non-crosslinkable monomer (A3) is preferably a vinyl monomer which does not contain fluorine. The fluorine-free non-crosslinkable monomer (A3) is generally a compound having one ethylenically unsaturated carbon-carbon double bond.

The preferred fluorine-free non-crosslinkable monomer (A3) is a compound of the formula:

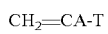

$CH_2=CA-T$ wherein A is a hydrogen atom, a methyl group, or a halogen atom other than a fluorine atom (e.g. a chlorine atom, a bromine atom or an iodine atom), and T is a hydrogen atom, a chain or cyclic hydrocarbon group having 1 to 40 carbon atoms, or a chain or cyclic organic group having 1 to 41 carbon atoms and having an ester bond.

Examples of the chain or cyclic hydrocarbon group having 1 to 40 carbon atoms include linear or branched aliphatic hydrocarbon groups having 1 to 40 carbon atoms, cycloaliphatic groups having 4 to 40 carbon atoms, aromatic hydrocarbon groups having 6 to 40 carbon atoms, and aromatic-aliphatic hydrocarbon groups having 7 to 40 carbon atoms.

Examples of the chain or cyclic organic group having 1 to 41 carbon atoms and having an ester bond include —C(=O)—O-Q and —O—C(=O)-Q (wherein Q is a linear or branched aliphatic hydrocarbon group having 1 to 40 carbon atoms, a cycloaliphatic group having 4 to 40 carbon atoms, an aromatic hydrocarbon group having 6 to 40 carbon atoms, or an aromatic-aliphatic hydrocarbon group having 7 to 40 carbon atoms).

Preferred examples of the fluorine-free non-crosslinkable monomer (A3) include ethylene, vinyl acetate, acrylonitrile, styrene, polyethylene glycol (meth)acrylate, polypropylene glycol (meth)acrylate, methoxy polyethylene glycol (meth)acrylate, methoxy polypropylene glycol (meth)acrylate and vinyl alkyl ethers. The fluorine-free non-crosslinkable monomer (A3) is not limited to these examples.

The fluorine-free non-crosslinkable monomer (A3) may be a (meth)acrylate ester having an alkyl group. The number of carbon atoms in the alkyl group may be 1 to 17. For example, the fluorine-free non-crosslinkable monomer (A3) may be an acrylate of the general formula:

$CH_2=CA^1COOA^2$ wherein $A^1$ is a hydrogen atom, a methyl group, or a halogen atom other than a fluorine atom (e.g. a chlorine atom, a bromine atom or an iodine atom), and $A^2$ is an alkyl group of $C_nH_{2n+1}$ (n=1 to 17).

The fluorine-containing monomer is not required to have a repeating unit derived from a (meth)acrylate ester having an alkyl group having 1 to 17 carbon atoms.

The fluorine-free non-crosslinkable monomer (A3) may be a (meth)acrylate monomer having a cyclic hydrocarbon group. The (meth)acrylate monomer having a cyclic hydrocarbon group is a compound having a cyclic hydrocarbon group (preferably monovalent) and a monovalent (meth)acrylate group. The monovalent cyclic hydrocarbon group is directly bonded to the monovalent (meth)acrylate group. Examples of the cyclic hydrocarbon group include saturated or unsaturated monocyclic groups, polycyclic groups and bridged ring groups. The cyclic hydrocarbon group is preferably saturated. The number of carbon atoms in the cyclic hydrocarbon group is preferably 4 to 20. Examples of the cyclic hydrocarbon group include cycloaliphatic groups having 4 to 20, particularly 5 to 12 carbon atoms, aromatic groups having 6 to 20 carbon atoms, and aromatic-aliphatic groups having 7 to 20 carbon atoms. The number of carbon atoms in the cyclic hydrocarbon group is particularly preferably 15 or less, for example 10 or less. Preferably, the carbon atom in the ring of the cyclic hydrocarbon group is directly bonded to the ester group in the (meth)acrylate group. The cyclic hydrocarbon group is preferably a saturated cycloaliphatic group.

Specific examples of the cyclic hydrocarbon group include a cyclohexyl group, a t-butylcyclohexyl group, an isobornyl group, a dicyclopentanyl group, a dicyclopentenyl group and an adamantyl group. The acrylate group is preferably an acrylate group or a methacrylate group, particularly a methacrylate group. Specific examples of the monomer having a cyclic hydrocarbon group include cyclohexyl (meth)acrylate, t-butylcyclohexyl (meth)acrylate, benzyl (meth)acrylate, isobornyl (meth)acrylate, dicyclopentanyl (meth)acrylate, dicyclopentenyl (meth)acrylate, dicyclopentanyloxyethyl (meth)acrylate, tricyclopentanyl (meth)acrylate, adamantyl (meth)acrylate, 2-methyl-2-adamantyl (meth)acrylate and 2-ethyl-2-adamantyl (meth)acrylate.

The fluorine-free non-crosslinkable monomer (A3) may be halogenated olefin. The halogenated olefin may be a halogenated olefin having 2 to 20 carbon atoms and substituted with 1 to 10 chlorine atoms, bromine atoms or iodine atoms. The halogenated olefin is preferably a chlorinated olefin having 2 to 20 carbon atoms, particularly an olefin having 2 to 5 carbon atoms and 1 to 5 chlorine atoms. Preferred specific examples of the halogenated olefin include vinyl halides such as vinyl chloride, vinyl bromide and vinyl iodide, and vinylidene halides such as vinylidene chloride, vinylidene bromide and vinylidene iodide.

(A4) Fluorine-Free Crosslinkable Monomer

The water- and oil-repellent polymer may have a repeating unit derived from the fluorine-free crosslinkable monomer (A4). The fluorine-free crosslinkable monomer (A4) is a monomer which does not contain a fluorine atom. The fluorine-free crosslinkable monomer (A4) may be a compound which has at least two reactive groups and/or ethylenically unsaturated carbon-carbon double bonds and which does not contain fluorine. The fluorine-free crosslinkable monomer (A4) may be a compound having at least two ethylenically unsaturated carbon-carbon double bonds, or a compound having at least one ethylenically unsaturated carbon-carbon double bond and at least one reactive group. Examples of the reactive group include a hydroxyl group, an epoxy group, a chloromethyl group, a blocked isocyanate group, an amino group and a carboxyl group.

Examples of the fluorine-free crosslinkable monomer (A4) include, but are not limited to, diacetone acrylamide, (meth)acrylamide, N-methylolacrylamide, hydroxymethyl (meth)acrylate, hydroxyethyl (meth)acrylate, 3-chloro-2-hydroxypropyl (meth)acrylate, 2-acetoacetoxyethyl (meth)acrylate, N,N-dimethylaminoethyl (meth)acrylate, N,N-diethylaminoethyl (meth)acrylate, butadiene, isoprene, chloroprene and glycidyl (meth)acrylate.

Copolymerization with the fluorine-free non-crosslinkable monomer (A3) and/or the fluorine-free crosslinkable monomer (A4) enables improvement of water- and oil-repellency, antifouling property, and various properties for such performance such as cleaning durability, washing durability, solubility in solvents, hardness and feeling if necessary.

The monomer may be polymerized in the presence of at least one compound selected from the group consisting of a blocked isocyanate compound and an organopolysiloxane compound. The amount of the blocked isocyanate compound (or organopolysiloxane compound) may be 0 to 100 parts by weight, for example 1 to 50 parts by weight, based on 100 parts by weight of the monomer.

Polymerization of the monomer in the presence of the blocked isocyanate compound gives a polymer having a blocked isocyanate group. The blocked isocyanate compound is an isocyanate blocked by at least one blocking agent. Examples of the blocking agent include oximes, phenols, alcohols, mercaptans, amides, imides, imidazoles, ureas, amines, imines, pyrazoles and active methylene compounds. Other examples of the blocking agent include pyridinols, thiophenols, diketones and esters. The blocked isocyanate compound may be modified with a compound having a hydrophilic group.

Polymerization of the monomer in the presence of the organopolysiloxane compound (e.g. mercapto-functional organopolysiloxane or vinyl-functional organopolysiloxane) gives a polymer having a siloxane group. In an embodiment, the mercapto-functional organopolysiloxane has a siloxy unit of the following general formula:

$$(R_2SiO)_a(RR^NSiO)_b(RR^SSiO)_c$$

wherein a is 0 to 4,000, or 0 to 1,000, or 0 to 400,
b is 1 to 1,000, or 1 to 100, or 1 to 50,
c is 1 to 1,000, or 1 to 100, or 1 to 50,
R is independently a monovalent organic group, or
R is a hydrocarbon having 1 to 40 carbon atoms, or
R is a monovalent alkyl group having 1 to 12 carbon atoms, or
R is a methyl group,
$R^N$ is a monovalent amino-functional organic group, and
$R^S$ is a monovalent mercapto-functional organic group.

Particularly preferred combinations of monomers in the water- and oil-repellent polymer are as follows:

fluorine-containing monomer (A1)+fluorine-free monomer (A2) (particularly long-chain (meth)acrylate ester monomer (A2-i));
long-chain (meth)acrylate ester monomer (A2-i)+amide group-containing monomer (A2-ii);
long (meth)acrylate ester monomer (A2-i)+nitrogen-containing monomer (A2-iii); and
long-chain (meth)acrylate ester monomer (A2-i)+acrylamide monomer (A2-iv).

Preferably, the above combinations further include a halogenated olefin.

The amount of each of the fluorine-containing monomer (A1) and the long-chain hydrocarbon group-containing fluorine-free monomer (A2) (or the total amount of the monomer (A1) and the monomer (A2)) (it is to be noted that the total amount of the monomer (A1) and the monomer (A2) is 100 wt % or less) may be 30 to 100 wt %, preferably 32 to 98 wt %, for example 35 to 95 wt %, particularly 40 to 90 wt %, based on the amount of the water- and oil-repellent polymer.

In the water- and oil-repellent polymer, the amount of the fluorine-free non-crosslinkable monomer (A3) may be 1,000 parts by weight or less, for example 0.1 to 300 parts by weight, particularly 1 to 200 parts by weight, and the amount of the fluorine-free crosslinkable monomer (A4) may be 50 parts by weight or less, for example 30 parts by weight or less, particularly 0.1 to 20 parts by weight, based on 100 parts by weight of the total of the fluorine-containing monomer (A1) and the long-chain hydrocarbon group-containing fluorine-free monomer (A2).

The amount of the fluorine-free non-crosslinkable monomer (A3) may be 2 to 68 wt %, for example 5 to 65 wt %, particularly 10 to 60 wt %, based on the amount of the water- and oil-repellent polymer (or the total amount of the monomer (A1), the monomer (A2) and the monomer (A3)).

The number average molecular weight (Mn) of the water- and oil-repellent polymer may be generally 1,000 to 1,000,000, for example 2,000 to 500,000, particularly 3,000 to 200,000. In general, the number average molecular weight (Mn) of the water- and oil-repellent polymer is measured by GPC (gel permeation chromatography).

(B) Silicone Polymer

The silicone polymer is a polymer of the formula:

$$(R^{53})_3Si-O[-Si(R^{51})_2-O-]_a-[-Si(R^{51})(R^{52})-O-]_b-Si(R^{53})_3$$

wherein each $R^{51}$ independently represents a hydrogen atom, an alkyl group having 1 to 20 carbon atoms, an aryl group having 6 to 20 carbon atoms, or an alkoxy group having 1 to 4 carbon atoms,
each $R^{52}$ independently represents a saturated hydrocarbon group having 23 to 40 carbon atoms,
each $R^{53}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms,
a represents an integer of 0 or more, b represents an integer of 1 or more, and (a+b) is 5 to 200.

In $R^{51}$ and $R^{53}$, the alkyl group having 1 to 20 carbon atoms and the aryl group having 6 to 20 carbon atoms may be unsubstituted or substituted.

Specific examples of $R^{51}$ and $R^{53}$ include a methyl group, an ethyl group, a propyl group, a butyl group, a pentyl group, a hexyl group, a heptyl group, an octyl group, a nonyl group, a decyl group, a dodecyl group, a tetradecyl group, a hexadecyl group, an octadecyl group, a cyclopentyl group, a cyclohexyl group, a cycloheptyl group, a phenyl group, a tolyl group, a naphthyl group, or a group derived from any of the above-mentioned groups by replacing one or more, or all of hydrogen atoms bonded thereto by halogen atoms, amino groups, cyano groups or the like. $R^{51}$ and $R^{53}$ are each preferably a methyl group or an ethyl group.

$R^{51}$ and $R^{53}$ may have an alkyl group having 3 to 22 carbon atoms or an unsaturated hydrocarbon group (e.g. hydrocarbon group having an aromatic ring) having 8 to 40 carbon atoms. Preferably, $R^{51}$ and $R^{53}$ have no such a group.

In $R^{51}$ and $R^{53}$, the alkoxy group having 1 to 4 carbon atoms may be linear or branched. Examples of the alkoxy group having 1 to 4 carbon atoms include a methoxy group, an ethoxy group, a propoxy group and a butoxy group.

In view of easy industrial production and availability, $R^{51}$ and $R^{53}$ are each preferably a hydrogen atom or a methyl group, more preferably a methyl group.

The silicone polymer has at least one saturated hydrocarbon group having 23 to 40 carbon atoms. The saturated hydrocarbon group having 23 to 40 carbon atoms may be linear or branched, and is preferably an alkyl group. Specific examples of the saturated hydrocarbon group having 23 to 40 carbon atoms include a tricosyl group (23 carbon atoms), a lignoceryl group (tetracosyl group) (24 carbon atoms), a cerotyl group (hexacosyl group) (26 carbon atoms), a montyl group (octacosyl group) (28 carbon atoms), a melissyl group (triacontane group) (30 carbon atoms) and a dotriacontane group (32 carbon atoms).

a is an integer of 0 or more. In view of easy industrial production and availability, a is preferably 40 or less, more preferably 30 or less.

The total of a and b is 5 to 200. In view of easy industrial production, availability and easy handling, the total of a and b is preferably 10 to 100, more preferably 40 to 60. a may be 0 to 150, for example 1 to 100. The lower limit of b may be 1, 2 or 3, and the upper limit of b may be 150, 10 or 5.

When a or b is 2 or more, each of $R^{51}$ and $R^{52}$, present in plural, may be the same or different.

Preferably, methyl groups accounts for 50 mol % or more of the total of $R^{51}$, $R^{52}$ and $R^{53}$ groups.

The occurrence order of repeating units multiplied by a or b is not limited to the occurrence order shown in the formula, and is arbitrary. In other words, the silicone polymer may be a random polymer, or a block polymer.

Examples of the silicone polymer include the following.

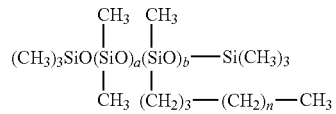

wherein a represents an integer of 0 to 150,
b represents an integer of 1 to 150,
(a+b) is 5 to 200, and
n is an integer of 19 to 36.

The amount of the silicone polymer may be 0.1 to 100 parts by weight, for example 1 to 30 parts by weight, particularly 2 to 10 parts by weight, based on 100 parts by weight of the water- and oil-repellent polymer.

The silicone polymer can be synthesized through a known method. The silicone polymer can be prepared by, for example, hydrosilylation reaction of an α-olefin with SiH group-containing silicone.

Examples of the SiH group-containing silicone include methyl hydrogen silicone polymers, and copolymers of dimethyl siloxane and methyl hydrogen siloxane having a polymerization degree of 10 to 200. Among them, methyl hydrogen silicone is preferable in view of easy industrial production and availability.

The α-olefin is a compound which is an origin of a saturated hydrocarbon group having 23 to 40 carbon atoms in a silicone polymer. Specific examples of the α-olefin include 1-tricosene, 1-tetracosene, 1-hexacosene, 1-octacosene, 1-triacontene and 1-dotriacontene.

For example, the hydrosilylation reaction may be carried out by reacting the α-olefin with the SiH group-containing silicone step by step or at a time in the presence of a catalyst if necessary.

The amounts of the SiH group-containing silicone and the α-olefin used for the hydrosilylation reaction can be each appropriately selected according to a SiH group equivalent of the SiH group-containing silicone, a number average molecular weight, or the like.

Examples of the catalyst used for the hydrosilylation reaction include compounds of platinum, palladium and the like, and among them, platinum compounds are preferable. Examples of the platinum compound include platinum chloride (IV).

The reaction conditions for the hydrosilylation reaction are not limited, and can be appropriately adjusted. The reaction temperature is, for example, 10 to 200° C., preferably 50 to 150° C. The reaction time can be set to 3 to 12 hours when the reaction temperature is 50 to 150° C.

Preferably, the hydrosilylation reaction is carried out in an inert gas atmosphere. Examples of the inert gas include nitrogen and argon. While the reaction proceeds under a solvent-free condition, a solvent may be used. Examples of the solvent include dioxane, methyl isobutyl ketone, toluene, xylene and butyl acetate.

(C) Liquid Medium

The water-repellent composition contains a liquid medium. The liquid medium is an organic solvent, water, or a mixture of an organic solvent or water and an organic solvent.

The water-repellent composition is generally a solution or a dispersion. The solution is a solution having a polymer dissolved in an organic solvent. The dispersion is an aqueous dispersion having a polymer dispersed in an aqueous medium (water or a mixture of water and an organic solvent).

Examples of the organic solvent include esters (e.g. esters having 2 to 40 carbon atoms, specifically ethyl acetate and butyl acetate), ketones (e.g. ketones having 2 to 40 carbon atoms, specifically methyl ethyl ketone and diisobutyl ketone), alcohols (e.g. alcohols having 1 to 40 carbon atoms, specifically isopropyl alcohol), aromatic solvents (e.g. toluene and xylene), and petroleum-based solvents (e.g. alkanes having 5 to 10 carbon atoms, specifically naphtha and kerosene).

The liquid medium may be water alone, or a mixture of water and a (water-miscible) organic solvent. The amount of the organic solvent may be 30 wt % or less, for example 10 wt % or less (preferably 0.1 wt % or more), based on the amount of the liquid medium. The liquid medium is preferably water alone.

(D) Surfactant

Preferably, the water-repellent composition contains a surfactant when the water-repellent composition is an aqueous dispersion.

In the water-repellent composition, the surfactant contains a nonionic surfactant. Preferably, the surfactant further contains one or more surfactants selected from a cationic surfactant, an anionic surfactant and an ampholytic surfactant. It is preferable to use a combination of a nonionic surfactant and a cationic surfactant.

(D1) Nonionic Surfactant

Examples of the nonionic surfactant include ethers, esters, ester ethers, alkanolamides, polyhydric alcohols and amine oxides.

Examples of the ether include compounds having an oxyalkylene group (preferably a polyoxyethylene group).

Examples of the ester include esters of alcohols and fatty acids. Examples of the alcohol include monohydric to hexahydric (particularly dihydric to pentahydric) alcohols having 1 to 50 carbon atoms (particularly 10 to 30 carbon atoms) (e.g. aliphatic alcohols). Examples of the fatty acid include saturated or unsaturated fatty acids having 2 to 50 carbon atoms, particularly 5 to 30 carbon atoms.

Examples of the ester ether include compounds obtained by adding an alkylene oxide (particularly ethylene oxide) to an ester of an alcohol and a fatty acid. Examples of the alcohol include monohydric to hexahydric (particularly dihydric to pentahydric) alcohols having 1 to 50 carbon atoms (particularly 3 to 30 carbon atoms) (e.g. aliphatic alcohols). Examples of the fatty acid include saturated or unsaturated fatty acids having 2 to 50 carbon atoms, particularly 5 to 30 carbon atoms.

For example, the alkanolamide is composed of a fatty acid and an alkanolamine. The alkanolamide may be a monoalkanolamide or a dialkanolamino. Examples of the fatty acid include saturated or unsaturated fatty acids having 2 to 50 carbon atoms, particularly 5 to 30 carbon atoms. The alkanolamine may be an alkanol having 2 to 50 carbon atoms, particularly 5 to 30 carbon atoms and having 1 to 3 amino groups and 1 to 5 hydroxyl groups.

The polyhydric alcohol may be a dihydric to pentahydric alcohol having 10 to 30 carbon atoms.

The amine oxide may be an oxide (e.g. 5 to 50 carbon atoms) of an amine (a secondary amine, or preferably a tertiary amine).

The nonionic surfactant is preferably a nonionic surfactant having an oxyalkylene group (preferably a polyoxyethylene group). The number of carbon atoms in the alkylene group in the oxyalkylene group is preferably 2 to 10. The number of oxyalkylene groups in the nonionic surfactant molecule is preferably 2 to 100 in general.

The nonionic surfactant is selected from the group consisting of an ether, an ester, an ester ether, an alkanolamide, a polyhydric alcohol and an amine oxide, and is preferably a nonionic surfactant having an oxyalkylene group.

The nonionic surfactant may be an alkylene oxide adduct of a linear and/or branched aliphatic (saturated and/or unsaturated) group, a polyalkylene glycol ester of a linear and/or a branched (saturated and/or unsaturated) fatty acid, a polyoxyethylene (POE)/polyoxypropylene (POP) copolymer (random copolymer or block copolymer), an alkylene oxide adduct of acetylene glycol, or the like. Among them, nonionic surfactants having polyoxyethylene (POE), polyoxypropylene (POP) or a POE/POP copolymer (which may be a random copolymer or a block copolymer) as a structure of the alkylene oxide adduct moiety and the polyalkylene glycol moiety are preferable.

Preferably, the nonionic surfactant has a structure in which an aromatic group is not present in view of environmental concerns (biodegradability, environmental hormones and the like).

The nonionic surfactant may be a compound of the formula:

$$R^1O\text{—}(CH_2CH_2O)_p\text{—}(R^2O)_q\text{—}R^3$$

wherein $R^1$ is an alkyl group having 1 to 22 carbon atoms, an alkenyl group having 2 to 22 carbon atoms, or an acyl group, each $R^2$, which are the same or different, is independently an alkylene group having 3 or more (e.g. 3 to 10) carbon atoms, $R^3$ is a hydrogen atom, an alkyl group having 1 to 22 carbon atoms, or an alkenyl group having 2 to 22 carbon atoms, p is a number of 2 or more, and q is a number of 0, or 1 or more.

Preferably, $R^1$ has 8 to 20 carbon atoms, particularly 10 to 18 carbon atoms. Preferred specific examples of $R^1$ include a lauryl group, a tridecyl group and an oleyl group.

Examples of $R^2$ include a propylene group and a butylene group.

In the nonionic surfactant, p may be a number of 3 or more (e.g. 5 to 200). q may be a number of 2 or more (e.g. 5 to 200). That is, —$(R^2O)_q$— may form a polyoxyalkylene chain.

The nonionic surfactant may be a polyoxyethylene alkylene alkyl ether containing a hydrophilic polyoxyethylene chain and a hydrophobic oxyalkylene chain (particularly a polyoxyalkylene chain) at the center. Examples of the hydrophobic oxyalkylene chain include an oxypropylene chain, an oxybutylene chain and a styrene chain, with an oxypropylene chain being preferable.

Specific examples of the nonionic surfactant include condensation products of ethylene oxide with hexylphenol, isooctylphenol, hexadecanol, oleic acid, an alkane($C_{12}$–$C_{16}$)thiol, a sorbitan mono-fatty acid ($C_7$-$C_{19}$), an alkyl($C_{12}$-$C_{18}$)amine or the like.

The ratio of the polyoxyethylene block to the molecular weight of the nonionic surfactant (copolymer) may be 5 to 80 wt %, for example 30 to 75 wt %, particularly 40 to 70 wt %.

The average molecular weight of the nonionic surfactant is generally 300 to 5,000, for example 500 to 3,000.

The nonionic surfactant may be a mixture of a compound having an HLB (hydrophile-lipophile balance) of less than 15 (particularly 5 or less) and a compound having an HLB of 15 or more. Examples of the compound having an HLB of less than 15 include sorbitan fatty acid esters. Examples of the compound having an HLB of 15 or more include polyoxyethylene alkyl ethers. The weight ratio between the compound having an HLB of less than 15 and the compound having an HLB of 15 or more may be 90:10 to 20:80, for example 85:15 to 55:45.

The nonionic surfactant may be a single type of nonionic surfactant, or a mixture of two or more types of nonionic surfactants.

(D) Cationic Surfactant

The cationic surfactant is preferably a compound free from an amide group.

The cationic surfactant may be an amine salt, a quaternary ammonium salt or an oxyethylene adduct-type ammonium salt. Specific examples of the cationic surfactant include, but are not limited to, amine salt-type surfactants such as alkylamine salts, aminoalcohol fatty acid derivatives, polyamine fatty acid derivatives and imidazoline, and quaternary ammonium salt-type surfactants such as alkyltrimethylammonium salts, dialkyldimethylammonium salts, alkyldimethylbenzylammonium salts, pyridinium salts, alkylisoquinolinium salts and benzethonium chloride.

Preferred examples of the cationic surfactant include compounds of:

$$R^{21}\text{—}N^+(\text{—}R^{22})(\text{—}R^{23})(\text{—}R^{24})X^-$$

wherein $R^{21}$, $R^{22}$, $R^{23}$ and $R^{24}$ are each a hydrocarbon group having 1 to 40 carbon atoms, and X is an anionic group.

Specific examples of $R^{21}$, $R^{22}$, $R^{23}$ and —$R^{24}$ include alkyl groups (e.g. methyl group, butyl group, stearyl group and palmityl group). Specific examples of X include halogens (e.g. chlorine) and acids (e.g. chloric acid and acetic acid).

The cationic surfactant is particularly preferably a monoalkyltrimethylammonium salt (in which the alkyl has 4 to 40 carbon atoms).

The cationic surfactant is preferably an ammonium salt. The cationic surfactant may be an ammonium salt of the formula:

$$R^1_p\text{—}N^+R^2_qX^-$$

wherein $R^1$ is a linear and/or branched aliphatic (saturated and/or unsaturated) group having 12 or more carbon atoms (e.g. $C_{12}$-$C_{50}$), $R^2$ is H, a C1-4 alkyl group, a benzyl group or a polyoxyethylene group (the number of oxyethylene groups is, for example, 1 (particularly 2, especially 3) to 50) (particularly preferably $CH_3$ or $C_2H_5$), X is a halogen atom (e.g.), or a $C_1$-$C_4$ fatty acid salt group, p is 1 or 2, q is 2 or 3, and p+q is 4. The number of carbon atoms of $R^1$ may be 12 to 50, for example 12 to 30.

Specific examples of the cationic surfactant include dodecyltrimethylammonium acetate, trimethyltetradecylammonium chloride, hexadecyltrimethylammonium bromide, trimethyloctadecylammonium chloride, (dodecylmetylbenzyl)trimethylammonium chloride, benzyldodecyldimethylammonium chloride, methyldodecyldi(hydropolyoxyethylene)ammonium chloride, benzyldodecyldi(hydropolyoxyethylene)ammonium chloride and N-[2-(diethylamino)ethyl]oleamide hydrochloride.

Examples of the ampholytic surfactant include alanines, imidazolinium betaines, amide betaines and acetic acid betaines, and specific examples thereof include lauryl betaine, stearyl betaine, laurylcarboxymethylhydroxyethyl imidazolinium betaine, lauryldimethylaminoacetic acid betaine and fatty acid amidopropyldimethylaminoacetic acid betaine.

One or more nonionic surfactants, one or more cationic surfactants and one or more ampholytic surfactants may be combined.

The amount of the cationic surfactant may be 5 wt % or more, preferably 10 wt % or more, more preferably 20 wt % or more, based on the total amount of surfactants. The weight ratio between the nonionic surfactant and the cationic surfactant is preferably 95:5 to 20:80, more preferably 85:15 to 40:60.

The amount of the cationic surfactant may be 0.05 to 10 parts by weight, for example 0.1 to 8 parts by weight, based on 100 parts by weight of the polymer. The total amount of surfactants may be 0.1 to 20 parts by weight, for example 0.2 to 10 parts by weight, based on 100 parts by weight of the polymer.

(E) Other Ingredients

The surface treatment agent may contain at least one of fluorine-free water-repellent compounds and additives as ingredients other than the water- and oil-repellent polymer, the liquid medium and the surfactant.

(E1) Fluorine-Free Water-Repellent Compound

The surface treatment agent may contain a water-repellent compound which does not contain a fluorine atom (fluorine-free water-repellent compound).

The fluorine-free water-repellent compound may be a fluorine-free acrylate polymer, a saturated or unsaturated hydrocarbon compound or a silicone-based compound.

The fluorine-free acrylate polymer is a homopolymer composed of a single kind of fluorine-free acrylate monomer, a copolymer composed of at least two kinds of fluorine-free acrylate monomers, or a copolymer composed of at least one kind of fluorine-free acrylate monomer and at least one kind of another fluorine-free monomer (ethylenically unsaturated compound, e.g. ethylene or vinyl-based monomer).

The fluorine-free acrylate monomer that forms the fluorine-free acrylate polymer is a compound of the formula:

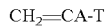

$CH_2=CA-T$ wherein A is a hydrogen atom, a methyl group, or a halogen atom other than a fluorine atom (e.g. a chlorine atom, a bromine atom or an iodine atom), T is a hydrogen atom, a chain or cyclic hydrocarbon group having 1 to 40 carbon atoms, or a chain or cyclic organic group having 1 to 41 carbon atoms and having an ester bond.

Examples of the chain or cyclic hydrocarbon group having 1 to 40 carbon atoms include linear or branched aliphatic hydrocarbon groups having 1 to 40 carbon atoms, cycloaliphatic groups having 4 to 40 carbon atoms, aromatic hydrocarbon groups having 6 to 40 carbon atoms, and aromatic-aliphatic hydrocarbon groups having 7 to 40 carbon atoms.

Examples of the chain or cyclic organic group having 1 to 41 carbon atoms and having an ester bond include —C(=O)—O-Q and —O—C(=O)-Q (wherein Q is a linear or branched aliphatic hydrocarbon group having 1 to 40 carbon atoms, a cycloaliphatic group having 4 to 40 carbon atoms, an aromatic hydrocarbon group having 6 to 40 carbon atoms, or an aromatic-aliphatic hydrocarbon group having 7 to 40 carbon atoms).

Examples of the fluorine-free acrylate monomer include alkyl (meth)acrylates, polyethylene glycol (meth)acrylate, polypropylene glycol (meth)acrylate, methoxypolyethylene glycol (meth)acrylate and methoxypolypropylene glycol (meth)acrylate.

The fluorine-free acrylate monomer is preferably an alkyl (meth)acrylate ester. The number of carbon atoms in the alkyl group may be 1 to 40, for example 6 to 40 (e.g. 10 to 30). Specific examples of the fluorine-free acrylate monomer include lauryl (meth)acrylate, stearyl (meth)acrylate and behenyl (meth)acrylate.

The fluorine-free acrylate polymer can be produced through the same polymerization method as for the water- and oil-repellent polymer.

The saturated or unsaturated hydrocarbon-based compound is preferably a saturated hydrocarbon. The number of carbon atoms in the saturated or unsaturated hydrocarbon-based compound may be 15 or more, preferably 20 to 300, for example 25 to 100. Specific examples of the saturated or unsaturated hydrocarbon-based compound include paraffin.

The silicone-based compound is a compound that is generally used as a water-repellent agent. The silicone-based compound is not limited as long as it is a compound which exhibits water-repellency.

The amount of the fluorine-free water-repellent compound may be 500 parts by weight or less, for example 5 to 200 parts by weight, particularly 5 to 100 pars by weight, based on 100 parts by weight of the water- and oil-repellent polymer.

(E2) Additives

The surface treatment agent may contain additives.

Examples of the additives include silicon-containing compounds, wax and acrylic emulsions. Other examples of the additives include other fluorine-containing polymers, drying rate adjusters, cross-linking agents, film formation aids, compatibilizers, surfactants, antifreezing agents, viscosity modifiers, ultraviolet absorbers, antioxidants, pH adjusters, antifoaming agents, feeling modifiers, slippage modifiers, antistatic agents, hydrophilizing agents, antibacterial agents, preservatives, insect repellents, fragrant agents and flame retarders.

The water- and oil-repellent polymer in the present disclosure can be produced through any of usual polymerization methods, and conditions for polymerization reaction can be arbitrarily selected. Examples of the polymerization method include solution polymerization, suspension polymerization and emulsion polymerization.

For the solution polymerization, a method is employed which includes dissolving a monomer in an organic solvent in the presence of a polymerization initiator, followed by nitrogen purge, and then stirring the resulting solution under heating at 30 to 120° C. for 1 to 10 hours. Examples of the polymerization initiator include azobisisobutyronitrile, benzoyl peroxide, di-t-butyl peroxide, lauryl peroxide, cumene hydroperoxide, t-butyl peroxypivalate and diisopropyl peroxydicarbonate. The polymerization initiator is used in an amount of 0.01 to 20 parts by weight, for example 0.01 to 10 parts by weight, based on 100 parts by weight of the monomer.

The organic solvent is inactive against monomers, and dissolves the monomers. For example, the organic solvent may be an ester (e.g. an ester having 2 to 40 carbon atoms, specifically ethyl acetate or butyl acetate), a ketone (e.g. a ketone having 2 to 40 carbon atoms, specifically methyl ethyl ketone or diisobutyl ketone), or an alcohol (e.g. an alcohol having 1 to 40 carbon atoms, specifically isopropyl alcohol). Specific examples of the organic solvent include acetone, chloroform, HCHC225, isopropyl alcohol, pentane, hexane, heptane, octane, cyclohexane, benzene, toluene, xylene, petroleum ether, tetrahydrofuran, 1,4-dioxane, methyl ethyl ketone, methyl isobutyl ketone, diisobutyl ketone, ethyl acetate, butyl acetate, 1,1,2,2-tetrachloroethane, 1,1,1-trichloroethane, trichloroethylene, perchloroethylene, tetrachlorodifluoroethane and trichlorotrifluoroethane. The organic solvent is used in an amount of 10 to 2,000 parts by weight, for example 50 to 1,000 parts by weight, based on 100 parts by weight of the total of monomers.

For the emulsion polymerization, a method is employed which includes emulsifying a monomer in water in the presence of a polymerization initiator and an emulsifier, followed by nitrogen purge, and then stirring the resulting emulsion at 50 to 80° C. for 1 to 10 hours to polymerize the monomer. Examples of the polymerization initiator include water-soluble polymerization initiators such as benzoyl peroxide, lauroyl peroxide, t-butyl perbenzoate, 1-hydroxycyclohexyl hydroperoxide, 3-carboxypropionyl peroxide, acetyl peroxide, azobisisobutylamidine-dihydrochloride, sodium peroxide, potassium persulfate and ammonium persulfate, and oil-soluble polymerization initiators such as azobisisobutyronitrile, benzoyl peroxide, di-t-butyl peroxide, lauryl peroxide, cumene hydroperoxide, t-butyl peroxypivalate and diisopropyl peroxydicarbonate. The polymerization initiator is used in an amount of 0.01 to 10 parts by weight based on 100 parts by weight of the monomer.

For obtaining an aqueous dispersion of polymer which is excellent in standing stability, it is desirable to micronize the monomer in water using an emulsification apparatus capable of applying intense crushing energy, such as a high-pressure homogenizer or an ultrasonic homogenizer, and polymerize the micronized monomer. The emulsifier may be any of various anionic, cationic or nonionic emulsifiers, and is used in an amount of 0.5 to 20 parts by weight based on 100 parts by weight of the monomer. It is preferable to use anionic and/or nonionic and/or cationic emulsifiers. When monomers are not completely compatible, it is preferable to add a compatibilizer for making the monomers sufficiently compatible, such as a water-soluble organic solvent or a low-molecular-weight monomer. Addition of the compatibilizer enables improvement of emulsifiability and copolymerizability.

Examples of the water-soluble organic solvent include acetone, methyl ethyl ketone, ethyl acetate, propylene glycol, dipropylene glycol monomethyl ether, dipropylene glycol, tripropylene glycol and ethanol, and the water-soluble organic solvent may be used in an amount of 1 to 50 parts by weight, for example 10 to 40 parts by weight, based on 100 parts by weight of water. Examples of the low-molecular-weight monomer include methyl methacrylate, glycidyl methacrylate and 2,2,2-trifluoroethyl methacrylate, and the low-molecular-weight monomer may be used in an amount of 1 to 50 parts by weight, for example 10 to 40 parts by weight, based on 100 parts by weight of the total of monomers.

In the polymerization, a chain transfer agent may be used. The molecular weight of the polymer can be changed according to the amount of the chain transfer agent used. Examples of the chain transfer agent include mercaptan group-containing compounds such as lauryl mercaptan, thioglycol and thioglycerol (particularly alkyl mercaptans (having 1 to 40 carbon atoms, for example)), and inorganic salts such as sodium hypophosphite and sodium hydrogen sulfite. The amount of the chain transfer agent used may be 0.01 to 10 parts by weight, for example 0.1 to 5 parts by weight, based on 100 parts by weight of the total of monomers.

The treatment agent of the present disclosure may be in the form of a solution, an emulsion (particularly an aqueous dispersion) or aerosol, and is preferably in the form of an aqueous dispersion. The treatment agent contains a water- and oil-repellent polymer (active ingredient of the surface treatment agent) and a medium (particularly a liquid medium, e.g. an organic solvent and/or water). The amount of the medium may be, for example, 5 to 99.9 wt %, particularly 10 to 80 wt %, based on the amount of the treatment agent.

In the treatment agent, the concentration of the water- and oil-repellent polymer may be 0.01 to 95 wt %, 0.1 to 60 wt %, for example 5 to 50 wt %.

The treatment agent of the present disclosure can be applied to an object to be treated using a known method. Usually, a method is employed which includes dispersing the treatment agent in an organic solvent or water to dilute, adhering the resulting dispersion to a surface of the object to be treated using a known method such as immersion coating, spray coating or foam coating, and drying the coating. If necessary, the treatment agent may be applied together with an appropriate cross-linking agent (e.g. blocked isocyanate), and cured. Further, an insect repellent, a softening agent, an antibacterial agent, a flame retarder, an antistatic agent, a coating material fixer, a wrinkle-resistant agent and the like can be added to and combined with the treatment agent of the present disclosure. The concentration of the water- and oil-repellent polymer in a treatment liquid to be brought into contact with a substrate may be 0.01 to 10 wt % (particularly in immersion coating), for example 0.05 to 10 wt %.

Examples of the object to be treated with the treatment agent of the present disclosure (e.g. water- and oil-repellent agent) include textile products, stone materials, filters (e.g. electrostatic filters), antidust masks, components of fuel cells (e.g. gas diffusion electrodes and gas diffusion supports), glass, paper, wood, leather, fur, asbestos, bricks, cement, metals and oxides, ceramic products, plastics, coated surfaces and plasters. Examples of the textile products include various products such as animal and plant natural fibers such as cotton, hemp, wool and silk fibers, synthetic fibers such as polyamide, polyester, polyvinyl alcohol, polyacrylonitrile, polyvinyl chloride and polypropylene fibers, semisynthetic fibers such as rayon and acetate fibers, inorganic fibers such as glass fibers, carbon fibers and asbestos fibers, and mixtures of any of these fibers.

The textile product may be in the form of any of fibers, fabrics and the like.

The treatment agent of the present disclosure can be used as an internal mold release agent or an external mold release agent.

The water- and oil-repellent polymer can be applied to a fibrous substrate (e.g. textile product) through one of methods known for treating a textile product with a liquid. When the textile product is a fabric, the fabric may be immersed in a solution, or a solution may be adhered or sprayed to the fabric. The treated textile product is dried, preferably heated at, for example, 100° C. to 200° C., for developing oil-repellency.

Alternatively, the water- and oil-repellent polymer may be applied to a textile product through a cleaning method. For example, the water- and oil-repellent polymer may be applied to a textile product in washing application or a dry cleaning method.

The textile product to be treated is typically a fabric, and examples of the fabric include woven fabrics, knitted fabrics, nonwoven fabrics, clothing fabrics and carpets. Alternatively, the textile product may be a fiber, a yarn or an intermediate textile product (e.g. a sliver or a rove). The textile product material may be a natural fiber (e.g. cotton or wool fiber), a chemical fiber (e.g. viscose rayon or lyocell), a synthetic fiber (e.g. polyester, polyamide or acrylic fiber), or a mixture of fibers (e.g. mixture of natural fibers and synthetic fibers). The water- and oil-repellent polymer of the present disclosure is particularly effective for making cellulose-based fibers (e.g. cotton or rayon fibers) lipophobic and oil-repellent. The method in the present disclosure generally makes textile products hydrophobic and water-repellent.

Alternatively, the fibrous substrate may be leather. For making the leather hydrophobic and lipophobic, the water- and oil-repellent polymer in the form of an aqueous solution or an aqueous emulsion may be applied to the leather in various stages of leather processing, for example in a leather wetting processing period or a leather finishing period.

Alternatively, the fibrous substrate may be paper. The water- and oil-repellent polymer may be applied to paper molded in advance, or applied in various stages of paper-making, for example in a paper drying period.

The "treatment" means that by immersion, spraying, coating or the like, the treatment agent is applied to the object to be treated. The treatment causes the polymer as an active ingredient of the treatment agent to permeate the inside of the object to be treated and/or adhere to a surface of the object to be treated.

EXAMPLES

Hereinafter, the present disclosure will be described in detail by way of Examples, which should not be construed as limiting the present disclosure.

Hereinafter, unless otherwise specified, "part", "%" and "ratio" represent "part by weight", "wt %" and "weight ratio", respectively.

The test procedures are as follows.

Water-Repellency Test

A treatment liquid having a solid concentration of 1.5% was prepared, and a fabric was immersed in the test solution, then caused to pass through a mangle, and heat-treated. The water-repellency of the thus-obtained test fabric was evaluated. The water-repellency of the treated fabric was evaluated in accordance with the spray method specified in JIS-L-1092 (AATCC-22). The results are shown in terms of water-repellency No. in the table below. The greater the score, the better the water-repellency.

| Water-repellency No. | State |
| --- | --- |
| 100 | The surface is not wet, and has no water droplets. |
| 90 | The surface is not wet, and has small water droplets. |
| 80 | The surface has small individual wet parts like water droplets. |
| 70 | Half the surface is wet, and small individual wet parts permeate the fabric. |
| 50 | The entire surface is wet. |
| 0 | The entire surface and back surface are wet. |

Strong Water-Repellency Test

In the test conducted in accordance with the spray method specified in JIS-L-1092 (AATCC-22), ease of repelling water contacting the fabric and the speed of the water flowing down from the fabric were visually evaluated. The results are shown in terms of strong water-repellency No. in the table below. The greater the score, the better the strong water-repellency.

| Strong water-repellency No. | State |
| --- | --- |
| 5 | Water contacting the fabric is repelled so as to move a long way away from the fabric, few droplets are generated on the fabric, and the water droplets immediately flow down. |
| 4 | Water contacting the fabric is repelled so as to move away from the fabric, and the speed of the water flowing down from the fabric is lower than that in the state "5". |
| 3 | Water contacting the fabric is repelled so as to slightly float from the fabric, and water droplets are generated on the fabric, and roll down without remaining on the fabric. |
| 2 | Water contacting the fabric does not substantially move away from the fabric, and while water droplets generated on the fabric roll down, a larger amount of water droplets remain on the fabric as compared to the state "3". |
| 1 | Water contacting the fabric rolls along the fabric, and a large amount of water droplets remain on the fabric. |

Washing Durability Test

In accordance with JIS L-0217 103, the water-repellency of a test fabric washed ten times and then dried by a tumbler dryer (at 60° C. for 30 minutes) was evaluated.

Slippage Resistance Test

The slippage resistance test was conducted in accordance with JIS-L-1096 Method B. A polyester fabric (white) treated with a water-repellent agent was cut into five test pieces of 10 cm×17 cm in each of a longitudinal direction and a lateral direction. The test piece was folded in half with the front face inside, and cut along the folding line, and the cut pieces were stitched together at 1 cm apart from the cut end with a normal sewing-machine needle #11. Here, a lockstitch seam system was employed, the number of seams per cm was set to 5, and a yarn of polyester filaments 78 dex×3 was used. A grab method was carried out using a tensile tester. In the grab method, the test piece was clamped at a clamp distance of 7.62 cm, and a predetermined load (49.0 N (5 kgf)) was applied at a tension speed of 30 cm per minute. Thereafter, the test piece was removed from the clamp, and left standing for 1 hour, followed by visually examining the maximum pore size in slippage of a load at which slacks in the vicinity of seams were eliminated. Test pieces with few pores were rated "Good", test pieces with pores having a small size were rated "Moderate", and test pieces with pores having a large size were rated "Poor".

Stability of Aqueous Dispersion

The aqueous dispersion was left standing at room temperature, and it was visually examined whether separations and solids were found. Evaluation was made in accordance with the following criteria.

Good: The dispersion is uniform.
Fair: There exist a small amount of separations and solids.
Poor: There exist a large amount of separations and solids.

Gum-Up Evaluation 1,000 g of a test liquid is prepared by adjusting the solid concentration of the aqueous dispersion to 1.8% with water of hardness 16. The test liquid is introduced into a pad capable of being controlled to a temperature of 40° C. A polyester fabric having a width of 20 cm and a length of 80 cm is shaped into a loop so that the fabric can be continuously treated in a mangle. The fabric is continuously treated at a mangle pressure of 0.4 MPa for 1 hour. After 1 hour, the amount of solids adhering to the mangle was examined visually and by hand contact, and evaluated in accordance with the following criteria.
Good: There are no solids.
Fair: There are a small amount of solids.
Poor: There are a large amount of solids.
Antifoaming Property Evaluation
A test liquid is prepared by adjusting the solid concentration of the polymer dispersion to 0.3% with water of hardness 43. The test liquid is heated to 40° C. Air was injected at 20 L/min into the test liquid to bubble the test liquid for 10 minutes, and the height (unit: mm) of the formed bubbles was measured.
Feeling Evaluation
Five measurers performed sensory evaluation on the following five-point scale, and an average of the scores given by the measurers was employed.
5: Very soft
4: Soft
3: Comparable to untreated fabric
2: Hard
1: Vary hard
Chalk Mark Evaluation
A plastic rod with a tip having a diameter of 5 mm was pressed against the treated fabric, and dragged, followed by visually examining whether a trail of the rod remained on the fabric. Evaluation was performed on a five-point scale as described below.
5: There is no trail.
4: There is little trail.
3: There is a little trail.
2: There is a trail.
1: There is an evident trail.

Synthesis Example 1

[Synthesis of C18URA (Stearyl Group-Containing Urethane Acrylate)]

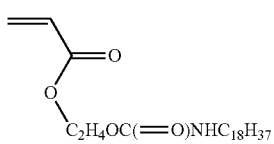

A 1 L four-necked flask was charged with 80.2 g of hydroxyethyl acrylate, 100 g of ethyl acetate, 0.03 g of a polymerization inhibitor and 0.03 g of a tin catalyst. A stirring rod, a thermometer and a reflux tube were set. 201.4 g of octadecyl isocyanate was dissolved in 100 g of ethyl acetate, and a dropping funnel was charged with the resulting solution. The dropping funnel was set on the flask, and the temperature was raised to 70° C. The solution of octadecyl isocyanate in ethyl acetate was gradually dropped from the dropping funnel over about 30 minutes with attention to heat generation. After completion of the dropping, the resulting mixture was further reacted for about 2 hours. Disappearance of the peak of the isocyanate was confirmed in infrared spectroscopy (IR), and the reaction was terminated. The reaction product was reprecipitated in methanol, washed with methanol, and dried under reduced pressure to give white powder. The reaction product was identified as C18URA by $^1$H-NMR.

The melting point of the compound was about 73° C. as measured with a differential scanning calorimeter (DSC).

Synthesis Example 2

[Synthesis of C18ureaA (Stearyl Group-Containing Urea Acrylate)]

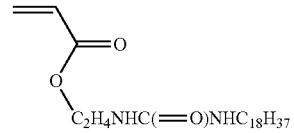

A 1 L four-necked flask was charged with 200 g of stearylamine, 100 g of ethyl acetate and 0.03 g of a polymerization inhibitor. A stirring rod, a thermometer and a reflux tube were set. 2-acryloyloxyethyl isocyanate was dissolved in 100 g of ethyl acetate, and a dropping funnel was charged with the resulting solution. The dropping funnel was set on the flask, and the solution of 2-acryloyloxyethyl isocyanate in ethyl acetate was gradually dropped from the dropping funnel at room temperature over about 30 minutes with attention to heat generation. After completion of the dropping, the resulting mixture was further reacted for about 2 hours. Disappearance of the peak of the isocyanate was confirmed in infrared spectroscopy (IR), and the reaction was terminated. The reaction product was reprecipitated in methanol, washed with methanol, and dried under reduced pressure to give white powder. The reaction product was identified as C18UreaA by 1H-NMR. The melting point of the compound was about 83° C. as measured with a differential scanning calorimeter (DSC).

Synthesis Example 3

[Synthesis of C18ureaMA (Stearyl Group-Containing Urea Methacrylate)]

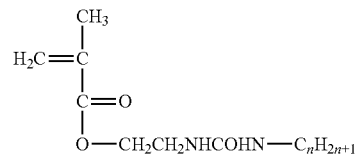

(n=18)
A 1 L four-necked flask was charged with 200 g of stearylamine, 100 g of ethyl acetate and 0.03 g of a polymerization inhibitor. A stirring rod, a thermometer and a reflux tube were set. 2-methacryloyloxyethyl isocyanate was dissolved in 100 g of ethyl acetate, and a dropping funnel was charged with the resulting solution. The dropping funnel was set on the flask, and the solution of 2-methacryloyloxyethyl isocyanate in ethyl acetate was gradually dropped from the dropping funnel at room temperature over about 30 minutes with attention to heat generation. After completion of the dropping, the resulting mixture was further reacted for about 2 hours. Disappearance of the peak of the isocyanate was confirmed in infrared spectroscopy (IR), and the reaction was terminated. The reaction product was reprecipitated in methanol, washed with methanol, and dried under reduced pressure to give white powder. The reaction product was identified as C18ureaMA by 1H-NMR. The melting point of the compound was about 91° C. as measured with a differential scanning calorimeter (DSC).

Production Example 1

A 200 cc four-necked flask equipped with a nitrogen introduction tube, a thermometer, a stirring rod and a reflux tube was charged with 40 g of stearyl acrylate (StA), 0.04 g of lauryl mercaptan (LSH) and 56 g of toluene, and the resulting mixture was stirred at room temperature for 30 minutes under a nitrogen flow. Thereafter, a solution obtained by dissolving 0.4 g of an azo group-containing oil-soluble polymerization initiator in 4 g of toluene was added, the resulting mixture was heated to 80° C., and subjected to polymerization reaction for 8 hours. After preparation of a polymer, toluene was further added to prepare Toluene Solution 1 having a solid concentration of 20%.

Production Examples 2 to 7

Polymerization was performed in the same manner as in Production Example 1 with the compositional ingredients shown in Table 1, and the polymers thus obtained were then diluted with toluene to prepare Toluene Solutions 2 to 7 having a solid concentration of 20%.

Production Example 8

A 200 mL four-necked flask was charged with 12 g of methyl hydrogen silicone oil (the molar ratio of SiH:SiCH$_3$ is 60:40 as measured by $^1$H NMR) and 0.02 g of a Pt catalyst for hydrosilylation. A stirring rod, a thermometer and a reflux tube were set, and a dropping funnel was charged with 36 g of $CH_2=CH-(CH_2CH_2)_n-CH_2CH_3$ (n=11). The $CH_2=CH-(CH_2CH_2)_n-CH_2CH_3$ (n=11) was dropped from the dropping funnel while the temperature was maintained at 70° C. After completion of the dropping, the mixture was further reacted at 70° C. for about 3 hours. Disappearance of the peak of SiH was confirmed in infrared spectroscopy (IR). In this way, Silicone Polymer 6 was prepared.

Production Examples 9 and 10

Silicone Polymers 9 and 10 were prepared by performing synthesis according to the compositional ingredients shown in Table 2 in the same manner as in Production Example 8.

Comparative Production Examples 1 to 5

Comparative Silicone Polymers 1 to 5 were prepared by performing synthesis according to the compositional ingredients shown in Table 2 in the same manner as in Production Example 8.

Production Example 11

A 500 ml plastic container was charged with 30 g of a water-soluble glycol-based solvent, 40 g of C6SFMA, 40 g of stearyl acrylate (StA), 180 g of pure water, 2 g of a cationic emulsifier, 2 g of a sorbitan fatty acid ester and 6 g of a polyoxyethylenealkyl, and the resulting mixture was heated to 60° C., stirred with a homomixer at 2,000 rpm for 1 minute, and then ultrasonically emulsified and dispersed for 15 minutes. The emulsified dispersion was transferred into a 500 ml autoclave, followed by nitrogen purge, and then 0.2 g of lauryl mercaptan (LSH) and 20 g of vinyl chloride were added. Further, 1 g of an azo group-containing water-soluble initiator was added, and the resulting mixture was heated to 60° C., and reacted for 4 hours to give an aqueous dispersion of a polymer. The dispersion was diluted with pure water to prepare Aqueous Dispersion 9 having a solid concentration of 20%.

Production Examples 12 and 14

Polymerization was performed according to the compositional ingredients shown in Table 3 in the same manner as in Production Example 11, and the polymers thus obtained were then diluted with pure water to prepare Aqueous Dispersions 12 and 14 having a solid concentration of 30%.

Production Examples 15 to 18 and 20 to 22

Polymerization was performed in the same manner as in Production Example 11 except that ingredients were added according to the compositional ingredients shown in Table 3, and then heated to 80° C. The polymers thus obtained were diluted with pure water to prepare Aqueous Dispersions 15 to 18 and 20 to 22 having a solid concentration of 30%.

Production Example 13

A 500 ml plastic container was charged with 17 g of a water-soluble glycol-based solvent, 60 g of StA, 136 g of pure water, 0.6 g of a cationic emulsifier, 1 g of a sorbitan fatty acid ester and 4.4 g of a polyoxyethylenealkyl ether, and the resulting mixture was heated to 60° C., stirred with a homomixer at 2,000 rpm for 1 minute, and then ultrasonically emulsified and dispersed for 15 minutes. The emulsified dispersion was transferred into a 500 cc four-necked flask equipped with a nitrogen introduction tube, a thermometer, a stirring rod and a reflux tube, followed by nitrogen purge, and 0.1 g of LSH was then added. The resulting mixture was stirred, 0.6 g of an azo group-containing water-soluble initiator was then added, and the resulting mixture was heated to 60° C., and reacted for 4 hours to give an aqueous dispersion of a polymer. Thereafter, pure water was added to prepare Aqueous Dispersion 13 having a solid concentration of 30%.

Production Example 19

Polymerization was performed in the same manner as in Production Example 13 except that ingredients were added according to the compositional ingredients shown in Table 3, and then heated to 80° C. The polymer thus obtained was diluted with pure water to prepare Aqueous Dispersion 19 having a solid concentration of 30%.

Production Example 23

A 250 ml plastic container was charged with 28 g of Silicone Polymer 8, 5.6 g of a water-soluble glycol-based solvent, 60 g of pure water, 1.7 g of sorbitan fatty acid ester (HLB: 5 or less), 0.7 g of a polyoxyethylenealkyl ether (HLB: 15 or more) and 0.6 g of a cationic emulsifier, and the resulting mixture was heated to 75° C., stirred with a homomixer at 2,000 rpm for 1 minute, and then ultrasonically emulsified and dispersed for 10 minutes to give an aqueous dispersion. Thereafter, pure water was added to prepare Aqueous Dispersion 23 having a solid concentration of 30%.

Production Examples 24 to 25

Aqueous dispersions were prepared according to the compositional ingredients shown in Table 4 in the same manner as in Production Example 23, and the aqueous dispersions were then diluted with pure water to prepare Aqueous Dispersions 24 and 25 having a solid concentration of 30%.

Comparative Production Example 6

A 250 ml plastic container was charged with 28 g of Comparative Silicone Polymer 1, 5.6 g of a water-soluble glycol-based solvent, 60 g of pure water, 1.7 g of sorbitan fatty acid ester (HLB: 5 or less), 0.7 g of a polyoxyethyleneallkyl ether (HLB: 15 or more) and 0.6 g of a cationic emulsifier, and the resulting mixture was heated to 75° C., stirred with a homomixer at 2,000 rpm for 1 minute, and then ultrasonically emulsified and dispersed for 10 minutes to give an aqueous dispersion. Thereafter, pure water was added to prepare Comparative Aqueous Dispersion 6 having a solid concentration of 30%.

Comparative Production Examples 7 to 13

Aqueous dispersions were prepared according to the compositional ingredients shown in Table 4 in the same manner as in Comparative Production Example 6, and the aqueous dispersions were then diluted with pure water to prepare Comparative Aqueous Dispersions 7 to 13 having a solid concentration of 30%.

The meanings of the abbreviations are as follows.

| Abbreviation | Name or molecular weight of compound |
|---|---|
| C6SFMA | $CF_3CF_2-(CF_2CF_2)_2-CH_2CH_2OCOC(CH_3)=CH_2$ |
| C6SFCLA | $CF_3CF_2-(CF_2CF_2)_2-CH_2CH_2OCOC(Cl)=CH_2$ |
| StA | Stearyl acrylate |
| C18URA | Stearyl group-containing urethane acrylate |
| C18ureaA | Stearyl group-containing urea acrylate |
| C18ureaMA | Stearyl group-containing urea methacrylate |
| C18AmEA | Stearic acid amidoethyl acrylate (stearic acid amide group-containing acrylate) |
| C16AmEA | Palmitic acid amidoethyl acrylate (palmitic acid amide group-containing acrylate) |
| LSH | Lauryl mercaptan |

TABLE 1

| | Prod. Ex. 1 | Prod. Ex. 2 | Prod. Ex. 3 | Prod. Ex. 4 | Prod. Ex. 5 | Prod. Ex. 6 | Prod. Ex. 7 |
|---|---|---|---|---|---|---|---|
| StA | 40 | | | | | | |
| C18URA | | 40 | | | | | |
| C18ureaA | | | 40 | | | | |
| C18ureaMA | | | | 40 | | | |
| C18AmEA | | | | | 40 | | 28 |
| C16AmEA | | | | | | 40 | 12 |
| LSH | 0.04 | 0.04 | 0.04 | 0.04 | 0.04 | 0.04 | 0.04 |
| Toluene | 56 | 56 | 56 | 56 | 56 | 56 | 56 |
| Toluene (for dilution of azo group-containing oil-soluble polymerization initiator) | 4 | 4 | 4 | 4 | 4 | 4 | 4 |
| Azo group-containing oil-soluble polymerization initiator | 0.4 | 0.4 | 0.4 | 0.4 | 0.4 | 0.4 | 0.4 |

The numbers in the table indicate the numbers of grams.

TABLE 2

| | Composition of a silicone polymer | | | | | | | | |
|---|---|---|---|---|---|---|---|---|---|
| | Molar ratio SiH:SiCH3 (1H NMR) | Prod. Ex. 8 | Prod. Ex. 9 | Prod. Ex. 10 | Com. Prod. Ex. 1 | Com. Prod. Ex. 2 | Com. Prod. Ex. 3 | Com. Prod. Ex. 4 | Com. Prod. Ex. 5 |
| Methyl hydrogen silicone oil | 90:10 | | | 7.6 | | | | | |
| Methyl hydrogen silicone oil | 60:40 | 12 | | | | | | | 12 |
| Methyl hydrogen silicone oil | 50:50 | | | | 14 | 14 | 14 | 14 | |
| Methyl hydrogen silicone oil | 30:70 | | 17 | | | | | | |
| CH2=CH—(CH2CH2)n-CH2CH3 (n = 14) | | | | 45 | | | | | |
| CH2=CH—(CH2CH2)n-CH2CH3 (n = 11) | | 36 | 36 | | | | | | 18 |
| CH2=CH—(CH2CH2)n-CH2CH3 (n = 7) | | | | | 25 | | | | |
| CH2=CH—(CH2CH2)n-CH2CH3 (n = 6) | | | | | | 22 | | | 11 |
| CH2=CH—(CH2CH2)n-CH2CH3 (n = 4) | | | | | | | 17 | | |
| CH2=CH—(CH2CH2)n-CH2CH3 (n = 2) | | | | | | | | 11 | |
| Pt catalyst for hydrosilylation | | 0.02 | 0.02 | 0.02 | 0.02 | 0.02 | 0.02 | 0.02 | 0.02 |

The numbers in the table indicate the numbers of grams.

TABLE 3

| | Prod. Ex. 11 | Prod. Ex. 12 | Prod. Ex. 13 | Prod. Ex. 14 | Prod. Ex. 15 | Prod. Ex. 16 | Prod. Ex. 17 | Prod. Ex. 18 | Prod. Ex. 19 | Prod. Ex. 20 | Prod. Ex. 21 | Prod. Ex. 22 |
|---|---|---|---|---|---|---|---|---|---|---|---|---|
| C6SFMA | 40 | | | | | | | | | | | |
| C6SFCLA | | 40 | | | | | | | | | | |
| StA | 40 | 40 | 60 | 80 | 40 | 40 | 40 | 40 | 30 | 40 | 40 | 50 |
| C18URA | | | | | 40 | | | | | | | |
| C18ureaA | | | | | | 40 | | | | | | |
| C18ureaMA | | | | | | | 40 | | | | | |
| C18AmEA | | | | | | | | 40 | 30 | | 28 | 21 |
| C16AmEA | | | | | | | | | | 40 | 12 | 9 |
| Vinyl chloride | 20 | 20 | | 20 | 20 | 20 | 20 | 20 | | 20 | 20 | 20 |
| Azo group-containing water-soluble initiator | 1 | 1 | 0.6 | 1 | 1 | 1 | 1 | 1 | 0.6 | 1 | 1 | 1 |
| LSH | 0.2 | 0.2 | 0.1 | 0.2 | 0.2 | 0.2 | 0.2 | 0.2 | 0.1 | 0.2 | 0.2 | 0.2 |
| Water-soluble glycol solvent | 30 | 30 | 17 | 30 | 30 | 30 | 30 | 30 | 17 | 30 | 30 | 30 |
| Cationic emulsifier | 2 | 2 | 0.6 | 2 | 2 | 2 | 2 | 2 | 0.6 | 2 | 2 | 2 |
| Sorbitan fatty acid ester | 2 | 2 | 1 | 2 | 2 | 2 | 2 | 2 | 1 | 2 | 2 | 2 |
| Polyoxyethylene alkyl ether | 6 | 6 | 4.4 | 6 | 6 | 6 | 6 | 6 | 4.4 | 6 | 6 | 6 |
| Pure water | 180 | 180 | 136 | 180 | 180 | 180 | 180 | 180 | 136 | 180 | 180 | 180 |

The numbers in the table indicate the numbers of grams.

TABLE 4

| | Prod. Ex. 23 | Prod. Ex. 24 | Prod. Ex. 25 | Com. Prod. Ex. 6 | Com. Prod. Ex. 7 | Com. Prod. Ex. 8 | Com. Prod. Ex. 9 | Com. Prod. Ex. 10 | Com. Prod. Ex. 11 | Com. Prod. Ex. 12 | Com. Prod. Ex. 13 |
|---|---|---|---|---|---|---|---|---|---|---|---|
| Silicone Polymer 8 | 28 | | | | | | | | 28 | 28 | 28 |
| Silicone Polymer 9 | | 28 | | | | | | | | | |
| Silicone Polymer 10 | | | 28 | | | | | | | | |
| Com. Silicone Polymer 1 | | | | 28 | | | | | | | |
| Com. Silicone Polymer 2 | | | | | 28 | | | | | | |
| Com. Silicone Polymer 3 | | | | | | 28 | | | | | |
| Com. Silicone Polymer 4 | | | | | | | 28 | | | | |
| Com. Silicone Polymer 5 | | | | | | | | 28 | | | |
| Water-soluble glycol solvent | 5.6 | 5.6 | 5.6 | 5.6 | 5.6 | 5.6 | 5.6 | 5.6 | 5.6 | 5.6 | 5.6 |
| Cationic emulsifier | 0.6 | 0.6 | 0.6 | 0.6 | 0.6 | 0.6 | 0.6 | 0.6 | 0.6 | 0.6 | 0.6 |
| Sorbitan fatty acid ester (HLB: 5 or less) | 1.7 | 1.7 | 1.7 | 1.7 | 1.7 | 1.7 | 1.7 | 2.4 | | | |
| Polyoxyethylene alkyl ether (HLB 8-13) | | | | | | | | | | 2.4 | |
| Polyoxyethylene alkyl ether (HLB: 15 or more) | 0.7 | 0.7 | 0.7 | 0.7 | 0.7 | 0.7 | 0.7 | 0.8 | | 2.4 | |
| Pure water | 60 | 60 | 60 | 60 | 60 | 60 | 60 | 60 | 60 | 60 | 60 |
| Aqueous dispersion stability | Good | Good | Good | Good | Good | Good | Good | Good | Bad | Bad-Fair | Fair |

Test Example 1

Toluene Solution 1, having a solid concentration of 20%, prepared in Production Example 1 and Silicone Polymer 8 prepared in Production Example 8 were adjusted to have a solid weight ratio of 3:1, and diluted with toluene to prepare a treatment liquid having a solid concentration of 1.5%. A polyester fabric (gray), a nylon fabric (black) and a cotton fabric (beige) were immersed in the treatment liquid, and then mildly treated with a centrifugal dryer for about 10 seconds. The wet pickup was about 65% for the polyester fabric, about 40% for the nylon fabric and about 95% for the cotton fabric. The treated fabric was dried overnight at room temperature, and then cured by passing through a pin tenter at 170° C. for 3 minutes. The water-repellency of the test fabrics treated in this way were evaluated through a water-repellency test and an strong water-repellency test based on the spray method specified in JIS L-1092. Table 5 shows the water-repellency results.

Test Examples 2 to 7

Toluene Solutions 2 to 7 prepared in Production Examples 2 to 7 and having a solid concentration of 20% and Silicone Polymer 8 prepared in Production Example 8 were diluted with toluene in the same manner as in Test Example 1 (solid concentration: 1.5%), fabrics were treated in the same manner as in Test Example 1, and water-repellency tests were conducted. Table 5 shows the results.

Test Examples 8 and 9

Toluene Solution 7 prepared in Production Example 7 and having a solid concentration of 20% and Silicone Polymers 9 and 10 prepared in Production Examples 9 and 10 were diluted with toluene in the same manner as in Test Example 1 (solid concentration: 1.5%), fabrics were treated in the same manner as in Test Example 1, and water-repellency tests were conducted. Table 5 shows the results.

Comparative Test Example 1

Toluene Solution 1 prepared in Production Example 1 and having a solid concentration of 20% was diluted to a solid concentration of 1.5% with toluene, fabrics were treated in the same manner as in Test Example 1, and water-repellency tests were conducted. Table 5 shows the results.

Comparative Test Examples 2 to 7

Toluene Solutions 2 to 7 prepared in Production Examples 2 to 7 and having a solid concentration of 20% were diluted with toluene in the same manner as in Comparative Test Example 1 (solid concentration: 1.5%), fabrics were treated in the same manner as in Test Example 1, and water-repellency tests were conducted. Table 5 shows the results.

Comparative Test Example 8

Silicone Polymer 8 prepared in Production Example 8 was diluted with toluene (solid concentration: 1.5%), fabrics were treated in the same manner as in Test Example 1, and water-repellency tests were conducted. Table 5 shows the results.

Comparative Test Example 9

Toluene Solution 1 prepared in Production Example 1 and having a solid concentration of 20% and Comparative Silicone Polymer 1 prepared in Comparative Production Example 1 were diluted with toluene in the same manner as in Test Example 1 (solid concentration: 1.5%), fabrics were treated in the same manner as in Test Example 1, and water-repellency tests were conducted. Table 5 shows the results.

Comparative Test Example 10

Toluene Solution 7 prepared in Production Example 7 and having a solid concentration of 20% and Comparative Silicone Polymer 1 prepared in Comparative Production Example 1 were diluted with toluene in the same manner as in Test Example 1 (solid concentration: 1.5%), fabrics were treated in the same manner as in Test Example 1, and water-repellency tests were conducted. Table 5 shows the results.

Test Example 10

Aqueous Dispersion 11 prepared in Production Example 11 and having a solid concentration of 30% and Aqueous Dispersion 23 prepared in Production Example 23 and having a solid concentration of 30% were adjusted to a weight ratio of 90:10, and diluted with tap water to prepare a treatment liquid having a solid concentration of 1.5%. A polyester fabric (gray), a nylon fabric (black) and a polyester fabric (white) were immersed in the treatment liquid, and wrung with a mangle. The wet pickup was about 55% for the polyester fabric (black), about 35% for the nylon fabric and about 65% for the polyester fabric (white). The treated fabric was dried and cured by passing through a pin tenter at 170° C. for 1 minute. The water-repellency of the test fabrics treated in this way were evaluated through a water-repellency test and an strong water-repellency test based on the spray method specified in JIS L-1092. Table 6 shows the water-repellency results.

Table 6 also shows the results of evaluating the water-repellency of the test fabrics washed ten times and then dried with a tumbler (at 60° C. for 30 minutes) in accordance with JIS L-0217 103.

Further, a slippage resistance test was conducted in accordance with JIS-L-1096 Method B for the polyester fabric (white), and feeling evaluation and chalk mark evaluation were performed for the polyester fabric (gray). Table 7 shows the results.

Test Examples 11 to 18 and 24 to 26

Treatment liquids were prepared in the same manner as in Test Example 10 except that Aqueous Dispersions 12 to 22 prepared in Production Examples 12 to 22 and having a solid concentration of 30% and Aqueous Dispersion 23 prepared in Production Example 23 and having a solid concentration of 30% were adjusted to a weight ratio of 90:10. The treatment liquids were used to treat fabrics in the same manner as in Test Example 6, and water-repellency tests were conducted. Table 6 shows the results.

Test Examples 19 and 20

Treatment liquids were prepared in the same manner as in Test Example 6 except that Aqueous Dispersion 14 prepared in Production Example 14 and having a solid concentration of 30% and Aqueous Dispersion 23 prepared in Production Example 23 and having a solid concentration of 30% were adjusted to weight ratios of 95:5 and 80:20. The treatment liquids were used to treat fabrics in the same manner as in Test Example 6, and water-repellency tests were conducted. Table 6 shows the results.

Test Examples 21 and 22

Treatment liquids were prepared in the same manner as in Test Example 10 except that Aqueous Dispersion 14 prepared in Production Example 14 and having a solid concentration of 30% and Aqueous Dispersions 24 and 25 prepared in Production Examples 24 and 25 and having a solid concentration of 30% were used. The treatment liquids were used to treat fabrics in the same manner as in Test Example 10, and water-repellency tests were conducted. Table 6 shows the results.

Test Example 23

A treatment liquid was prepared in the same manner as in Test Example 10 except that Aqueous Dispersion 18 prepared in Production Example 18 and having a solid concentration of 30% and Aqueous Dispersion 24 prepared in Production Example 24 and having a solid concentration of 30% were adjusted to a weight ratio of 90:10. The treatment liquid was used to treat fabrics in the same manner as in Test Example 10, and water-repellency tests were conducted. Table 6 shows the results.

Test Example 27

Similarly to Test Example 10, Aqueous Dispersion 13 prepared in Production Example 13 and having a solid concentration of 30% and Aqueous Dispersion 23 prepared in Production Example 23 and having a solid concentration of 30% were adjusted to a weight ratio of 90:10, a MDI-based blocked isocyanate (solid concentration: 20%) was added to a solid concentration of 0.1%, and the resulting mixture was diluted with tap water to prepare a treatment liquid. The treatment liquid was used to treat fabrics in the same manner as in Test Example 10, and water-repellency tests were conducted. Table 6 shows the results.

Test Example 28

Similarly to Test Example 10, Aqueous Dispersion 22 prepared in Production Example 22 and having a solid concentration of 30% and Aqueous Dispersion 23 prepared in Production Example 23 and having a solid concentration of 30% were adjusted to a weight ratio of 90:10, a MDI-based blocked isocyanate (solid concentration: 20%) was added to a solid concentration of 0.1%, and the resulting mixture was diluted with tap water to prepare a treatment liquid. The treatment liquid was used to treat fabrics in the same manner as in Test Example 10, and water-repellency tests were conducted. Table 6 shows the results.

Comparative Test Example 11

Aqueous Dispersion 11 prepared in Production Example 11 and having a solid concentration of 30% and Comparative Aqueous Dispersion 7 prepared in Comparative Production Example 7 and having a solid concentration of 30% were adjusted to a weight ratio of 90:10, and diluted to a solid concentration of 1.5% with tap water to prepare a treatment liquid. The treatment liquid was used to treat fabrics in the same manner as in Test Example 10, and water-repellency tests were conducted. Table 6 shows the results.

Comparative Test Examples 12 to 19 and 25 to 27

Aqueous Dispersions 12 to 22 prepared in Production Examples 12 to 22 and having a solid concentration of 30% and Comparative Aqueous Dispersion 7 prepared in Comparative Production Example 7 and having a solid concentration of 30% were treated in the same manner as in Comparative Test Example 7 to prepare treatment liquids. The treatment liquids were used to treat fabrics in the same manner as in Test Example 10, and water-repellency tests were conducted. Table 6 shows the results.

Comparative Test Examples 20 and 28 to 30

Aqueous dispersions 14 and 21 to 23 prepared in Production Examples 14 and 21 to 23 and having a solid concentration of 30% were diluted to a solid concentration of 1.5% with tap water to prepare treatment liquids. The treatment liquids were used to treat fabrics in the same manner as in Test Example 10, and water-repellency tests were conducted. Table 6 shows the results.

Comparative Test Examples 21 to 24

Aqueous Dispersion 14 prepared in Production Example 14 and having a solid concentration of 30% and Comparative Aqueous Dispersions 6 and 8 to 10 prepared in Comparative Production Examples 6 and 8 to 10 and having a solid concentration of 30% were treated in the same manner as in Comparative Test Example 11 to prepare treatment liquids. The treatment liquids were used to treat fabrics in the same manner as in Test Example 6, and water-repellency tests were conducted. Table 6 shows the results.

Comparative Test Example 31

Aqueous Dispersion 11 prepared in Production Example 11 and having a solid concentration of 30% was diluted with tap water to prepare a treatment liquid having a solid concentration of 1.5%. A polyester fabric (gray) was immersed in the treatment liquid, and then wrung with a mangle. The wet pickup was about 55%. The treated fabric was dried and cured by passing through a pin tenter at 170° C. for 1 minute. The test fabric treated in this way was used to perform feeling evaluation and chalk mark evaluation. Table 8 shows the results.

Comparative Test Example 32

Aqueous Dispersion 12 prepared in Production Example 12 and having a solid concentration of 30% was diluted with tap water to prepare a treatment liquid having a solid concentration of 1.5%. A polyester fabric (gray) was immersed in the treatment liquid, and then wrung with a mangle. The wet pickup was about 55%. The treated fabric was dried and cured by passing through a pin tenter at 170° C. for 1 minute. The test fabric treated in this way was used to perform feeling evaluation and chalk mark evaluation. Table 8 shows the results.

For Test Examples 13, 21 and 22 and Comparative Test Examples 14 and 20 to 24, a slippage resistance test was conducted. Table 7 shows the results.

For Test Examples 10, 11, 13, 20, 21, 24, 25, 29 and 30 and Comparative Test Examples 16, 28, 29, 31 and 32, gum-up evaluation and antifoaming property evaluation for treatment liquids were performed in addition to feeling evaluation and chalk mark evaluation. Table 8 shows the results.

TABLE 5

Solvent Treatment

| Test sample | | Test Ex. 1 Prod. Ex. 1/ Prod. Ex. 8 3:1 | Test Ex. 2 Prod. Ex. 2/ Prod. Ex. 8 3:1 | Test Ex. 3 Prod. Ex. 3/ Prod. Ex. 8 3:1 | Test Ex. 4 Prod. Ex. 4/ Prod. Ex. 8 3:1 | Test Ex. 5 Prod. Ex. 5/ Prod. Ex. 8 3:1 | Test Ex. 6 Prod. Ex. 6/ Prod. Ex. 8 3:1 | Test Ex. 7 Prod. Ex. 7/ Prod. Ex. 8 3:1 | Test Ex. 8 Prod. Ex. 7/ Prod. Ex. 9 3:1 | Test Ex. 9 Prod. Ex. 7/ Prod. Ex. 10 3:1 |
|---|---|---|---|---|---|---|---|---|---|---|
| Water repellency (Initial) | Polyester cloth (gray) | 100 | 100 | 90-100 | 100 | 100 | 90 | 100 | 100 | 100 |
| | Nylon cloth (Black) | 100 | 100 | 100 | 100 | 100 | 90 | 100 | 100 | 90-100 |
| | Cotton cloth (Beige) | 70-80 | 80 | 80 | 70 | 50 | 70 | 80 | 80 | 80 |
| Strong water repellency (Initial) | Polyester cloth (gray) | 2-3 | 3 | 2 | 2 | 3 | 2 | 3 | 3 | 3 |
| | Nylon cloth (Black) | 1-2 | 2-3 | 2 | 2 | 3 | 2 | 3 | 2-3 | 3 |
| | Cotton cloth (Beige) | 1 | 1 | 1 | 1 | 1 | 1 | 2 | 2 | 2 |

| Test sample | | Com. Test Ex. 1 Prod Ex. 1 | Com. Test Ex. 2 Prod. Ex. 2 | Com. Test Ex. 3 Prod. Ex. 3 | Com. Test Ex. 4 Prod. Ex. 4 | Com. Test Ex. 5 Prod. Ex. 5 | Com. Test Ex. 6 Prod. Ex. 6 | Com. Test Ex. 7 Prod. Ex. 7 | Com. Test Ex. 8 Prod. Ex. 8 | Com. Test Ex. 9 Prod. Ex. 1/ Com. Prod. Ex. 1 3:1 | Com. Test Ex. 10 Prod. Ex. 7/ Com. Prod. Ex. 1 3:1 |
|---|---|---|---|---|---|---|---|---|---|---|---|
| Water repellency (Initial) | Polyester cloth (gray) | 90 | 90-100 | 90 | 90 | 100 | 80 | 100 | 70 | 90 | 100 |
| | Nylon cloth (Black) | 90 | 90-100 | 90 | 90-100 | 80 | 80 | 90-100 | 70 | 90 | 90-100 |
| | Cotton cloth (Beige) | 70 | 70 | 80 | 70 | 50 | 50 | 50 | 50 | 70-80 | 70 |
| Strong water repellency (Initial) | Polyester cloth (gray) | 2 | 2 | 2 | 1 | 2 | 2 | 2 | 1 | 2 | 2-3 |
| | Nylon cloth (Black) | 1 | 2 | 1-2 | 1 | 2 | 1-2 | 2 | 1 | 2 | 2 |
| | Cotton cloth (Beige) | 1 | 1 | 1 | 1 | 1 | 1 | 1 | 1 | 1 | 1 |

TABLE 6

Aqueous Treatment

| Test sample | | Test Ex. 10 Prod. Ex. 11/ Prod. Ex. 23 90:10 | Test Ex. 11 Prod. Ex. 12/ Prod. Ex. 23 90:10 | Test Ex. 12 Prod. Ex. 13/ Prod. Ex. 23 90:10 | Test Ex. 13 Prod. Ex. 14/ Prod. Ex. 23 90:10 | Test Ex. 14 Prod. Ex. 15/ Prod. Ex. 23 90:10 | Test Ex. 15 Prod. Ex. 16/ Prod. Ex. 23 90:10 | Test Ex. 16 Prod. Ex. 17/ Prod. Ex. 23 90:10 | Test Ex. 17 Prod. Ex. 18/ Prod. Ex. 23 90:10 | Test Ex. 18 Prod. Ex. 19/ Prod. Ex. 23 90:10 | Test Ex. 19 Prod. Ex. 14/ Prod. Ex. 23 95:5 | Test Ex. 20 Prod. Ex. 14/ Prod. Ex. 23 80:20 |
|---|---|---|---|---|---|---|---|---|---|---|---|---|
| Water repellency (Initial) | Polyester cloth (gray) | 90-100 | 100 | 90 | 90-100 | 100 | 90 | 90 | 100 | 90-100 | 90-100 | 90-100 |
| | Nylon cloth (black) | 90-100 | 90-100 | 70 | 100 | 90-100 | 90 | 90 | 90-100 | 90-100 | 100 | 100 |

TABLE 6-continued

| | | | | | | | | | | | |
|---|---|---|---|---|---|---|---|---|---|---|---|
| Aqueous Treatment | | | | | | | | | | | |
| Water repellency (after washing ten times) | Polyester cloth (gray) | 90-100 | 90-100 | 50 | 90-100 | 90-100 | 80 | 80-90 | 90-100 | 50 | 90-100 | 90-100 |
| | Nylon cloth (Black) | 90 | 90-100 | 0-50 | 90-100 | 90-100 | 80 | 80 | 90-100 | 0-50 | 90-100 | 90-100 |
| Strong water repellency (Initial) | Polyester cloth (gray) | 4 | 4 | 2 | 2-3 | 3-4 | 2 | 2 | 3-4 | 2 | 2 | 2-3 |
| | Nylon cloth (black) | 4 | 4 | 2 | 2 | 3 | 2 | 1 | 3 | 2 | 2 | 2-3 |

| Test sample | | Test Ex. 21 Prod. Ex. 14/ Prod. Ex. 24 90:10 | Test Ex. 22 Prod. Ex. 14/ Prod. Ex. 25 90:10 | Test Ex. 23 Prod. Ex. 18/ Prod. Ex. 24 90:10 | Test Ex. 24 Prod. Ex. 20/ Prod. Ex. 23 90:10 | Test Ex. 25 Prod. Ex. 21/ Prod. Ex. 23 90:10 | Test Ex. 26 Prod. Ex. 22/ Prod. Ex. 23 90:10 | Test Ex. 27 Prod. Ex. 13/ Prod. Ex. 23 90:10 Blocked isocyanate | Test Ex. 28 Prod. Ex. 22/ Prod. Ex. 23 90:10 Blocked isocyanate |
|---|---|---|---|---|---|---|---|---|---|
| Water repellency (Initial) | Polyester cloth (gray) | 90-100 | 90-100 | 100 | 100 | 100 | 100 | 90 | 100 |
| | Nylon cloth (black) | 90-100 | 90 | 90-100 | 90 | 90-100 | 90-100 | 70 | 90-100 |
| Water repellency (after washing ten times) | Polyester cloth (gray) | 90 | 90 | 90-100 | 90 | 90-100 | 90 | 70 | 90-100 |
| | Nylon cloth (black) | 90 | 90 | 90-100 | 90 | 90-100 | 90 | 50 | 90-100 |
| Strong water repellency (Initial) | Polyester cloth (gray) | 2 | 2 | 3-4 | 3 | 3-4 | 3-4 | 2 | 3-4 |
| | Nylon cloth (black) | 2 | 2 | 3 | 3 | 3 | 3 | 2 | 3 |

| Test sample | | Com. Test Ex. 11 Prod. Ex. 11/ Com. Prod. Ex. 7 90:10 | Com. Test Ex. 12 Prod. Ex. 12/ Com. Prod. Ex. 7 90:10 | Com. Test Ex. 13 Prod. Ex. 13/ Com. Prod. Ex. 7 90:10 | Com. Test Ex. 14 Prod. Ex. 14/ Com. Prod. Ex. 7 90:10 | Com. Test Ex. 15 Prod. Ex. 15/ Com. Prod. Ex. 7 90:10 | Com. Test Ex. 16 Prod. Ex. 16/ Com. Prod. Ex. 7 90:10 | Com. Test Ex. 17 Prod. Ex. 17/ Com. Prod. Ex. 7 90:10 | Com. Test Ex. 18 Prod. Ex. 18/ Com. Prod. Ex. 7 90:10 | Com. Test Ex. 19 Prod. Ex. 19/ Com. Prod. Ex. 7 90:10 | Com. Test Ex. 20 Prod. Ex. 14 |
|---|---|---|---|---|---|---|---|---|---|---|---|
| Water repellency (Initial) | Polyester cloth (gray) | 90-100 | 90-100 | 90 | 90-100 | 90-100 | 80-90 | 80-90 | 90-100 | 90 | 90-100 |
| | Nylon cloth (Black) | 90 | 90-100 | 70 | 90 | 90-100 | 80-90 | 80 | 90-100 | 90 | 90 |
| Water repellency (after washing ten times) | Polyester cloth (gray) | 90-100 | 90 | 50 | 90 | 90 | 80 | 80 | 90 | 50 | 90-100 |
| | Nylon cloth (Black) | 90 | 90 | 0-50 | 90 | 90 | 80 | 80 | 90 | 0-50 | 80-90 |
| Strong water repellency (Initial) | Polyester cloth (gray) | 3-4 | 4 | 1 | 2 | 3 | 1 | 1 | 3 | 1-2 | 2 |
| | Nylon cloth (Black) | 4 | 4 | 1 | 2 | 2-3 | 1 | 1 | 2-3 | 1-2 | 2 |

TABLE 6-continued

| | | Aqueous Treatment | | | | | | | | | |
|---|---|---|---|---|---|---|---|---|---|---|---|
| Test sample | | Com. Test Ex. 21 Prod. Ex. 14/ Com. Prod. Ex. 6 90:10 | Com. Test Ex. 22 Prod. Ex. 14/ Com. Prod. Ex. 8 90:10 | Com. Test Ex. 23 Prod. Ex. 14/ Com. Prod. Ex. 9 90:10 | Com. Test Ex. 24 Prod. Ex. 14/ Com. Prod. Ex. 10 90:10 | Com. Test Ex. 25 Prod. Ex. 20/ Com. Prod. Ex. 7 90:10 | Com. Test Ex. 26 Prod. Ex. 21/ Com. Prod. Ex. 7 90:10 | Com. Test Ex. 27 Prod. Ex. 22/ Com. Prod. Ex. 7 90:10 | Com. Test Ex. 28 Prod. Ex. 21 | Com. Test Ex. 29 Prod. Ex. 22 | Com. Test Ex. 30 Prod. Ex. 23 |
| Water repellency (Initial) | Polyester cloth (gray) | 90-100 | 90 | 90 | 90 | 90-100 | 90-100 | 90-100 | 90-100 | 90-100 | 70 |
| | Nylon cloth (black) | 90 | 90 | 90 | 90 | 90 | 90-100 | 90-100 | 90-100 | 90-100 | 70 |
| Water repellency (after washing ten times) | Polyester cloth (gray) | 90-100 | 80-90 | 90 | 90 | 90 | 90 | 90 | 90 | 90 | 50 |
| | Nylon cloth (black) | 90 | 90 | 90 | 90 | 90 | 90 | 90 | 90 | 80-90 | 50 |
| Strong water repellency (Initial) | Polyester cloth (gray) | 2 | 1 | 1 | 1 | 2 | 3 | 3 | 2-3 | 2-3 | 1 |
| | Nylon cloth (black) | 2 | 1 | 1 | 1 | 2 | 2-3 | 2-3 | 2 | 2 | 1 |

TABLE 7

| | | Slippage resistance test | | | | | | | | |
|---|---|---|---|---|---|---|---|---|---|---|
| Test sample | | Test Ex. 13 Prod. Ex. 14/ Prod. Ex. 23 90:10 | Test Ex. 21 Prod. Ex. 14/ Prod. Ex. 24 90:10 | Test Ex. 22 Prod. Ex. 14/ Prod. Ex. 25 90:10 | Com. Test Ex. 20 Prod. Ex. 14 | Com. Test Ex. 14 Prod. Ex. 14/ Com. Prod. Ex. 7 90:10 | Com. Test Ex. 21 Prod. Ex. 14/ Com. Prod. Ex. 6 90:10 | Com. Test Ex. 22 Prod. Ex. 14/ Com. Prod. Ex. 8 90:10 | Com. Test Ex. 23 Prod. Ex. 18/ Com. Prod. Ex. 9 90:10 | Com. Test Ex. 24 Prod. Ex. 14/ Com. Prod. Ex. 10 90:10 |
| Slipping-down resistance | Polyester cloth (white) | Fair | Fair-Good | Fair | Fair | Bad | Bad-Fair | Bad | Bad | Fair |

TABLE 8

| Test sample | | Test Ex. 13 Prod. Ex. 14/ Prod. Ex. 23 90:10 | Test Ex. 21 Prod. Ex. 14/ Prod. Ex. 24 90:10 | Test Ex. 10 Prod. Ex. 11/ Prod. Ex. 23 90:10 | Test Ex. 11 Prod. Ex. 12/ Prod. Ex. 23 80:20 | Test Ex. 20 Prod. Ex. 14/ Prod. Ex. 23 90:10 | Test Ex. 24 Prod. Ex. 21/ Prod. Ex. 23 90:10 | Test Ex. 29 Prod. Ex. 21/ Prod. Ex. 24 90:10 | Test Ex. 25 Prod. Ex. 22/ Prod. Ex. 23 90:10 |
|---|---|---|---|---|---|---|---|---|---|
| Feeling | Polyester cloth (Gray) | 3 | 4 | 3 | 3 | 3 | 3 | 3 | 3 |
| Chalk mark | Polyester cloth (Gray) | 3 | 3 | 4 | 4 | 3 | 3 | 3 | 3 |
| Gum-up | | Good | Good | Fair | Good | Good | Good | Good | Good |
| Antifoaming property (mm) | | 63 | 70 | 25 | — | 40 | 15 | 20 | 15 |

TABLE 8-continued

|  |  | Test Ex. 30 Prod. Ex.22/ Prod. Ex. 24 Test sample 90:10 | Com. Test Ex. 16 Prod. Ex. 14 | Com. Test Ex. 31 Prod. Ex. 11 | Com. Test Ex. 32 Prod. Ex. 12 | Com. Test Ex. 28 Prod. Ex. 21 | Com. Test Ex. 29 Prod. Ex. 22 |
|---|---|---|---|---|---|---|---|
| Feeling | Polyester cloth (Gray) | 3 | 2 | 3 | 3 | 2 | 2-3 |
| Chalk mark | Polyester cloth (Gray) | 3-4 | 2 | 4 | 4 | 2 | 3 |
|  | Gum-up | Good | Fair | Bad | Fair | Fair | Fair |
|  | Antifoaming property (mm) | 18 | 135 | 38 | 280 | 40 | 35 |

INDUSTRIAL APPLICABILITY

The surface treatment agent of the present disclosure can be used as, for example, a water- and oil-repellent agent, a soil resistant agent and a soil release agent.

The invention claimed is:

1. A surface treatment agent comprising:
(A) a water- and oil-repellent polymer having a repeating unit derived from at least one water- and oil-repellent monomer selected from
(A1) a fluorine-containing monomer and
(A2) a fluorine-free monomer having a hydrocarbon group having 7 to 40 carbon atoms,
where the amount of the water- and oil-repellent monomer is 30 to 100 wt % based on the amount of the water- and oil-repellent polymer;
(B) a silicone polymer of the formula:

$(R^{53})_3Si-O-[-Si(R^{51})_2-O-]_a-[-Si(R^{51})(R^{52})-O-]_b-Si(R^{53})_3$ wherein each $R^{51}$ independently represents a hydrogen atom, an alkyl group having 1 to 20 carbon atoms, an aryl group having 6 to 20 carbon atoms, or an alkoxy group having 1 to 4 carbon atoms,
each $R^{52}$ independently represents a saturated hydrocarbon group having 23 to 40 carbon atoms,
each $R^{53}$ independently represents a hydrogen atom, an alkyl group having 1 to 20 carbon atoms, an aryl group having 6 to 20 carbon atoms, an alkoxy group having 1 to 4 carbon atoms, or a saturated hydrocarbon group having 23 to 40 carbon atoms,
a represents an integer of 0 or more, b represents an integer of 1 or more, and (a+b) is 10 to 200; and
(C) a liquid medium.

2. The surface treatment agent according to claim 1, wherein
the water- and oil-repellent monomer is the fluorine-containing monomer (A1), and
the fluorine-containing monomer (A1) is a compound of the formula:

$CH_2=C(-X^{11})-C(=O)-Y^{11}-Z^{11}-Rf$ wherein $X^{11}$ is a hydrogen atom, a monovalent organic group or a halogen atom,
$Y^{11}$ is —O— or —NH—,
$Z^{11}$ is a direct bond or a divalent organic group, and
Rf is a fluoroalkyl group having 1 to 20 carbon atoms.

3. The surface treatment agent according to claim 2, wherein in the fluorine-containing monomer (A1), $X^{11}$ is a hydrogen atom, a methyl group or a chlorine atom, $Y^{11}$ is —O—, $Z^{11}$ is a direct bond, or an alkylene group having 1 to 20 carbon atoms, and Rf is a perfluoroalkyl group.

4. The surface treatment agent according to claim 2, wherein in the fluorine-containing monomer (A1), the number of carbon atoms in Rf is 1 to 6.

5. The surface treatment agent according to claim 1, wherein the water- and oil-repellent monomer is the fluorine-free monomer (A2).

6. The surface treatment agent according to claim 5, wherein the fluorine-free monomer (A2) is a monomer of the formula:

$CH_2=C(-X)-C(=O)-Y-R_n$ wherein X is a hydrogen atom, a monovalent organic group or a halogen atom,
Y is a divalent to tetravalent linking group having at least one group selected from —O— and —NH—,
R is a hydrocarbon group having 7 to 40 carbon atoms, and
n is an integer of 1 to 3.

7. The surface treatment agent according to claim 6, wherein in the fluorine-free monomer (A2), Y is —Y'—, —Y'—C(=O)—, —C(=O)—Y'—, —Y'—C(=O)—Y'—, —Y'—R'—, —Y'—R'—Y'—, —Y'—R'—Y'—C(=O)—, —Y'—R'—C(=O)—Y'—, —Y'—R'—Y'—C(=O)—Y'— or —Y'—R'—Y'—R'—
wherein Y' is a direct bond, —O— or —NH—, and
R' is —(CH$_2$)$_m$—, wherein m is an integer of 1 to 5, or —C$_6$H$_6$-(phenylene group).

8. The surface treatment agent according to claim 1, wherein the fluorine-free monomer (A2) is at least one monomer selected from the group consisting of a compound of the formula:

$CH_2=C(-X^1)-C(=O)-Y^1-R^1$ wherein $X^1$ is a hydrogen atom, a monovalent organic group or a halogen atom,
$Y^1$ is —O— or —NH—, and
$R^1$ is a hydrocarbon group having 7 to 40 carbon atoms;
a compound of the formula:

$CH_2=C(-X^2)-C(=O)-Y^2-Z^1(-Z^2-R^2)_p$ wherein $X^2$ is a hydrogen atom, a monovalent organic group or a halogen atom,
$Y^2$ is —O— or —NH—,
$Z^1$ is a direct bond, or a divalent or trivalent hydrocarbon group having 1 to 5 carbon atoms, $Z^2$ each is independently a direct bond, or a divalent to tetravalent linking group having at least one group selected from —O— and —NH—, $R^2$ each is independently a hydrocarbon group having 7 to 40 carbon atoms, and p is 1 or 2; and a compound of the formula:

$R^{22}$—C(=O)—NH—$R^{23}$—O—$R^{21}$ wherein $R^{21}$ is an organic residue having an ethylenically unsaturated polymerizable group, $R^{22}$ is a hydrocarbon group having 7 to 40 carbon atoms, and $R^{23}$ is a hydrocarbon group having 1 to 5 carbon atoms.

9. The surface treatment agent according to claim 1, wherein the fluorine-containing monomer (A1) is at least one compound selected from the group consisting of $CH_2$=C(—H)—C(=O)—O—$(CH_2)_2$—$C_6F_{13}$;

$CH_2$=C(—$CH_3$)—C(=O)—O—$(CH_2)_2$—$C_6F_{13}$; and $CH_2$=C(—Cl)—C(=O)—O—$(CH_2)_2$—$C_6F_{13}$; and the fluorine-free monomer (A2) is at least one compound selected from the group consisting of stearyl (meth)acrylate and behenyl (meth)acrylate;

palmitic acid amidoethyl acrylate and stearic acid amidoethyl acrylate;

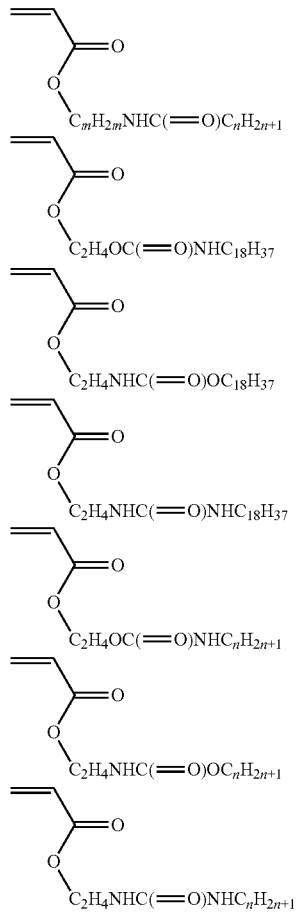

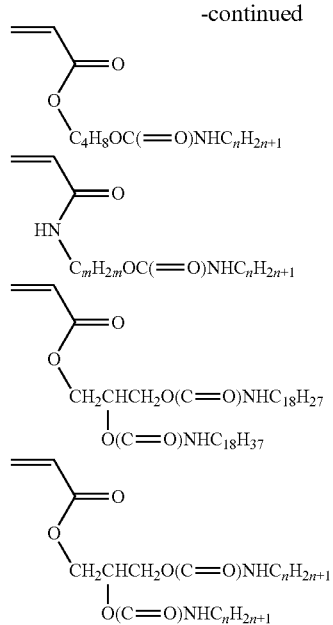

wherein m is an integer of 1 to 5, and n is an integer of 7 to 40, and a methacrylate having a methyl group at the α-position and an acrylate having a chlorine atom at the α-position in any of the above chemical formulae; and lauryl (meth)acrylamide, cetyl (meth)acrylamide, stearyl (meth)acrylamide and behenyl (meth)acrylamide.

10. The surface treatment agent according to claim 1, wherein the amount of the water- and oil-repellent polymer (A) is 0.1 to 60 wt % based on the amount of the surface treatment agent, and the amount of the silicone polymer (B) is 1 to 100 parts by weight based on 100 parts by weight of the water- and oil-repellent polymer (A).

11. The surface treatment agent according to claim 1, wherein the water- and oil-repellent polymer further has at least one selected from the group consisting of a repeating unit derived from a fluorine-free non-crosslinkable monomer (A3), and a repeating unit derived from a fluorine-free crosslinkable monomer (A4).

12. The surface treatment agent according to claim 11, wherein the fluorine-free non-crosslinkable monomer (A3) is at least one compound selected from the group consisting of vinyl chloride, vinyl bromide, vinyl iodide, vinylidene chloride, vinylidene bromide and vinylidene iodide, and the fluorine-free crosslinkable monomer (A4) is at least one compound selected from the group consisting of diacetone acrylamide, (meth)acrylamide, N-methylolacrylamide, hydroxymethyl (meth)acrylate, hydroxyethyl (meth)acrylate, 3-chloro-2-hydroxypropyl (meth)acrylate, 2-acetoacetoxyethyl (meth)acrylate, N,N-dimethylaminoethyl (meth)acrylate, N,N-diethylaminoethyl (meth)acrylate, butadiene, isoprene, chloroprene and glycidyl (meth)acrylate.

13. The surface treatment agent according to claim 1, wherein in the silicone polymer, none of $R^{51}$ and $R^{53}$ is an alkyl group having 3 to 22 carbon atoms.

14. The surface treatment agent according to claim 1, wherein in the silicone polymer, $R^{51}$ and $R^{53}$ each is independently a methyl group, an ethyl group, or an alkoxy group having 1 to 4 carbon atoms.

15. The surface treatment agent according to claim 11, wherein the amount of the water- and oil-repellent monomer is 32 to 98 wt % based on the amount of the water- and oil-repellent polymer (A),
the amount of the fluorine-free non-crosslinkable monomer (A3) is 2 to 68 wt % based on the amount of the water- and oil-repellent polymer, and
the amount of the fluorine-free crosslinkable monomer (A4) is 50 parts by weight or less based on 100 parts by weight of the water- and oil-repellent monomer.

16. The surface treatment agent according to claim 1, wherein the surface treatment agent is a water- and oil-repellent agent, a soil resistant agent or a soil release agent.

17. The surface treatment agent according to claim 1, wherein the fluorine-free monomer (A2) does not include behenyl (meth)acrylate.

18. The surface treatment agent according to claim 1, wherein none of $R^{51}$ and $R^{53}$ has an alkyl group having 3 to 22 carbon atoms or an unsaturated hydrocarbon group having 8 to 40 carbon atoms.

19. A method for producing the surface treatment agent according to claim 1, the method comprising:
(i) preparing an aqueous dispersion of a water- and oil-repellent polymer (A) by polymerizing in the presence of a liquid medium a monomer containing at least one water- and oil-repellent monomer selected from
(A1) a fluorine-containing monomer and
(A2) a fluorine-free monomer having a hydrocarbon group having 7 to 40 carbon atoms, the water- and oil-repellent polymer (A) having a repeating unit derived from the water- and oil-repellent monomer in an amount of 30 to 100 wt % based on the amount of the water- and oil-repellent polymer; and
(ii) adding a silicone polymer (B) to the aqueous dispersion of the water- and oil-repellent polymer.

20. A method for producing a treated substrate, the method comprising applying to the substrate the surface treatment agent according to claim 1.

* * * * *